US012317331B2

(12) United States Patent
Moon et al.

(10) Patent No.: US 12,317,331 B2
(45) Date of Patent: May 27, 2025

(54) METHOD AND APPARATUS FOR COMMUNICATION IN NETWORK HAVING ASYMMETRIC UPLINK AND DOWNLINK

(71) Applicant: ELECTRONICS AND TELECOMMUNICATIONS RESEARCH INSTITUTE, Daejeon (KR)

(72) Inventors: Sung Hyun Moon, Daejeon (KR); Cheul Soon Kim, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 330 days.

(21) Appl. No.: 17/852,510

(22) Filed: Jun. 29, 2022

(65) Prior Publication Data

US 2023/0011025 A1    Jan. 12, 2023

(30) Foreign Application Priority Data

Jun. 30, 2021  (KR) .................. 10-2021-0086117
Sep. 17, 2021  (KR) .................. 10-2021-0124876
Dec. 10, 2021  (KR) .................. 10-2021-0176787
Jun. 13, 2022  (KR) .................. 10-2022-0071500

(51) Int. Cl.
*H04W 74/08*     (2024.01)
*H04W 74/0833*   (2024.01)

(52) U.S. Cl.
CPC .............................. *H04W 74/0833* (2013.01)

(58) Field of Classification Search
CPC ........... H04W 74/0833; H04W 74/006; H04W 56/00; H04B 7/0695; H04B 7/088
See application file for complete search history.

(56) References Cited

U.S. PATENT DOCUMENTS

| | | | |
|---|---|---|---|
| 11,115,242 B2 | 9/2021 | Akkarakaran et al. | |
| 11,246,157 B2 | 2/2022 | Kim et al. | |
| 2018/0027593 A1 | 1/2018 | Lee | |
| 2019/0029036 A1 | 1/2019 | Wilson et al. | |
| 2019/0253941 A1* | 8/2019 | Cirik | H04W 36/0077 |
| 2020/0008188 A1* | 1/2020 | Nam | H04W 72/0446 |
| 2020/0145090 A1 | 5/2020 | Sun et al. | |
| 2021/0050894 A1 | 2/2021 | Priyanto et al. | |
| 2021/0120581 A1 | 4/2021 | Kim | |
| 2021/0144703 A1 | 5/2021 | Jung et al. | |
| 2021/0266059 A1 | 8/2021 | Noh et al. | |

FOREIGN PATENT DOCUMENTS

WO       2020/037207 A1    2/2020

* cited by examiner

*Primary Examiner* — Jamal Javaid
(74) *Attorney, Agent, or Firm* — Rabin & Berdo, P.C.

(57) ABSTRACT

A method of a terminal may comprise: receiving, from a base station, configuration information of SSB resources; receiving, from the base station, configuration information of PRACH resources; receiving, from the base station, an SSB in a first SSB resource among the SSB resources; configuring a PRACH resource set associated with the first SSB resource based on the configuration information of the PRACH resources; and transmitting a first PRACH in a first PRACH resource belonging to the PRACH resource set and transmitting a second PRACH in a second PRACH resource belonging to the PRACH resource set, wherein the first PRACH and the second PRACH include a same preamble sequence and are transmitted using different beams.

20 Claims, 21 Drawing Sheets without beam correspondence

With beam correspondence

METHOD AND APPARATUS FOR COMMUNICATION IN NETWORK HAVING ASYMMETRIC UPLINK AND DOWNLINK

CROSS-REFERENCE TO RELATED APPLICATIONS

This application claims priority to Korean Patent Applications No. 10-2021-0086117 filed on Jun. 30, 2021, No. 10-2021-0124876 filed on Sep. 17, 2021, No. 10-2021-0176787 filed on Dec. 10, 2021, and No. 10-2022-0071500 filed on Jun. 13, 2022 with the Korean Intellectual Property Office (KIPO), the entire contents of which are hereby incorporated by reference.

BACKGROUND

1. Technical Field

The present disclosure relates to a communication method and apparatus for a network having asymmetric uplink and downlink, and more particularly, to a method for performing communication between a base station and a terminal in a communication system in which transmission and reception points are deployed asymmetrically for uplink and downlink, and apparatuses therefor.

2. Related Art

Communication systems are continuously evolving to expand communication infrastructure for the realization of a hyper-connected society. For example, a new radio (NR) communication system can support a frequency band of up to 100 GHz as well as a frequency band of 6 GHz or below. In addition, as compared to the conventional communication system (e.g., long-term evolution (LTE) communication system), the NR communication system can support more diverse services and scenarios. For example, usage scenarios of the NR communication system may include enhanced Mobile BroadBand (eMBB), Ultra-Reliable Low-Latency communication (URLLC), massive Machine Type Communication (mMTC), and the like. In addition, the sixth generation (6G) communication system, which is being discussed recently, is expected to enable more diverse services and user experiences by utilizing a terahertz (THz) frequency band, artificial intelligence, satellite communication, quantum technologies, and the like. There are various requirements in the industry that such the communication system must satisfy, and high-level communication technologies are required to achieve the requirements.

SUMMARY

Accordingly, exemplary embodiments of the present disclosure are directed to providing an operation method of a terminal and an operation method of a base station in an asymmetric network communication system.

Also, exemplary embodiments of the present disclosure are directed to providing configurations of a terminal and a base station operating in an asymmetric network communication system.

According to a first exemplary embodiment of the present disclosure, a method of a terminal may comprise: receiving, from a base station, configuration information of synchronization signal block (SSB) resources; receiving, from the base station, configuration information of physical random access channel (PRACH) resources; receiving, from the base station, an SSB in a first SSB resource among the SSB resources; configuring a PRACH resource set associated with the first SSB resource based on the configuration information of the PRACH resources; and transmitting a first PRACH in a first PRACH resource belonging to the PRACH resource set and transmitting a second PRACH in a second PRACH resource belonging to the PRACH resource set, wherein the first PRACH and the second PRACH include a same preamble sequence and are transmitted using different beams.

The first PRACH resource and the second PRACH resource may be mapped to different time resources.

A beam used for transmitting the first PRACH and a beam used for transmitting the second PRACH may be determined by the terminal without correspondence with a beam used for receiving the SSB.

A transmission and reception point (TRP) for transmitting the SSB may be identical to or different from a TRP for receiving the first PRACH and/or the second PRACH.

The first PRACH resource may be further associated with a second SSB resource belonging to the SSB resources.

The method may further comprise receiving, from the base station, information on an association relationship between the SSB resources and the PRACH resources, wherein the PRACH resource set associated with the first SSB resource may be configured based on the information on the association relationship.

The PRACH resource set associated with the first SSB resource may be configured based on an index of the first SSB resource and indexes of PRACH resources belonging to the PRACH resource set.

When the configuration information of the PRACH resources indicates M PRACH resources, the PRACH resource set associated with the first SSB resource may consist of N PRACH resources, M and N may be each a natural number, and N may be equal to or less than M.

The first PRACH and the second PRACH may be transmitted with a same transmission power within a same transmission period or may be transmitted with different transmission powers within a same transmission period.

According to a second exemplary embodiment of the present disclosure, a method of a base station may comprise: transmitting, to a terminal, configuration information of SSB resources; transmitting, to the terminal, configuration information of PRACH resources; transmitting an SSB in a first SSB resource among the SSB resources; and receiving, from the terminal, a first PRACH in a first PRACH resource belonging to a PRACH resource set associated with the first SSB resource or a second PRACH in a second PRACH resource belonging to the PRACH resource set, wherein the first PRACH and the second PRACH include a same preamble sequence and are transmitted using different beams.

The first PRACH resource and the second PRACH resource may be mapped to different time resources.

A beam used for receiving the first PRACH and a beam used for receiving the second PRACH may not have correspondence with a beam used for transmitting the SSB.

A transmission and reception point (TRP) for transmitting the SSB may be identical to or different from a TRP for receiving the first PRACH and/or the second PRACH.

The first PRACH resource may be further associated with a second SSB resource belonging to the SSB resources.

The method may further comprise transmitting, to the terminal, information on an association relationship between the SSB resources and the PRACH resources, wherein the PRACH resource set associated with the first SSB resource may be configured based on the information on the association relationship.

The PRACH resource set associated with the first SSB resource may be configured based on an index of the first SSB resource and indexes of PRACH resources belonging to the PRACH resource set.

When the configuration information of the PRACH resources indicates M PRACH resources, the PRACH resource set associated with the first SSB resource may consist of N PRACH resources, M and N may be each a natural number, and N may be equal to or less than M.

According to a third exemplary embodiment of the present disclosure, a terminal may comprise: a processor; instructions executable by the processor; and a memory storing the instructions, wherein when executed by the processor, the instructions cause the terminal to: receive, from a base station, configuration information of SSB resources; receive, from the base station, configuration information of PRACH resources; receive, from the base station, an SSB in a first SSB resource among the SSB resources; configure a PRACH resource set associated with the first SSB resource based on the configuration information of the PRACH resources; and transmit a first PRACH in a first PRACH resource belonging to the PRACH resource set and transmit a second PRACH in a second PRACH resource belonging to the PRACH resource set, wherein the first PRACH and the second PRACH include a same preamble sequence and are transmitted using different beams.

A beam used for transmitting the first PRACH and a beam used for transmitting the second PRACH may be determined by the terminal without correspondence with a beam used for receiving the SSB.

A transmission and reception point (TRP) for transmitting the SSB may be identical to or different from a TRP for receiving the first PRACH and/or the second PRACH.

According to exemplary embodiments of the present disclosure, a communication method and apparatus for an asymmetric UL/DL network are provided. Accordingly, the performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

DETAILED DESCRIPTION OF THE EMBODIMENTS

Figure 1:
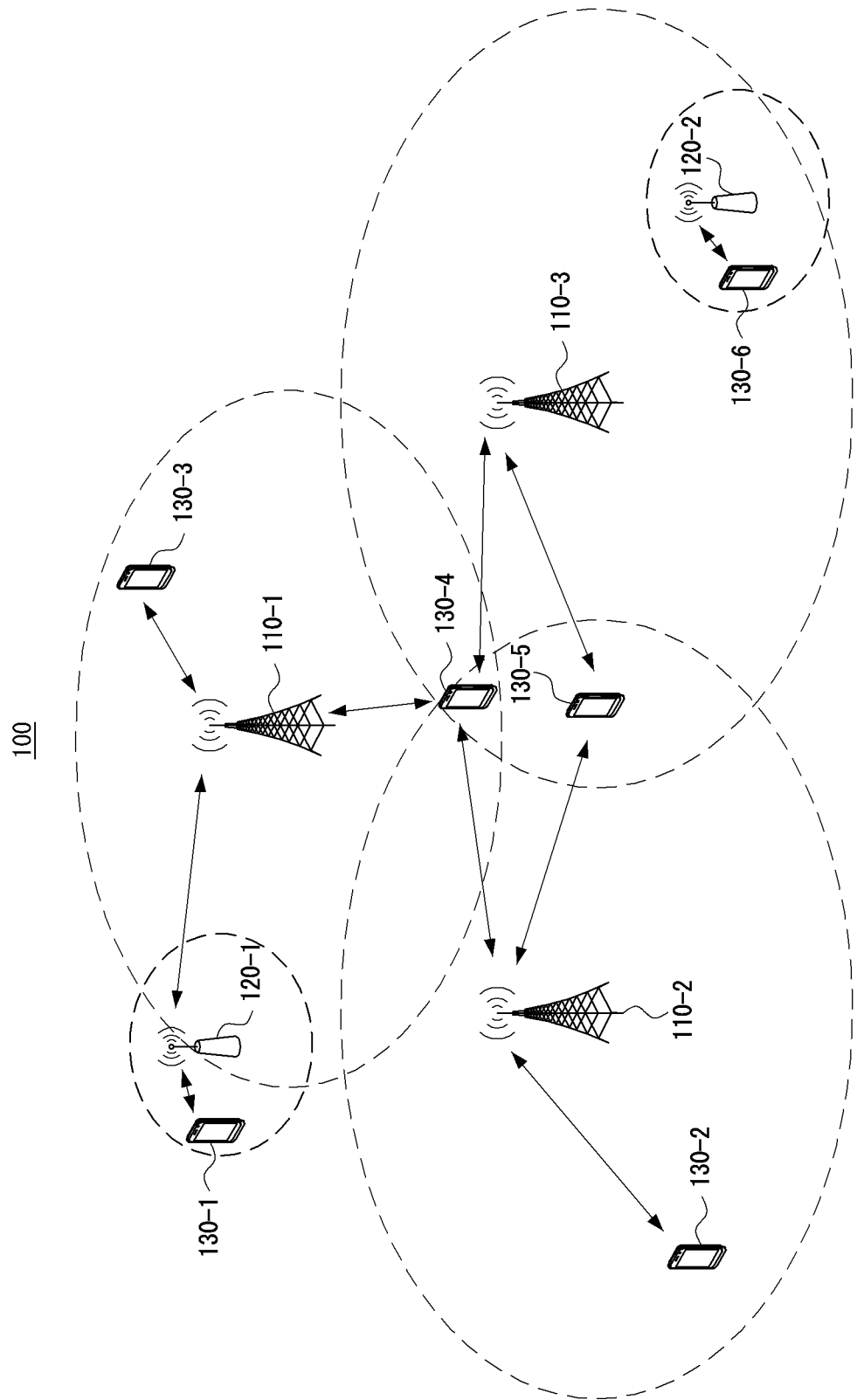
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may mean an apparatus or a device. Exemplary embodiments may be performed by an apparatus or device. A structure of the apparatus (or, device) may be as follows.

Figure 2:
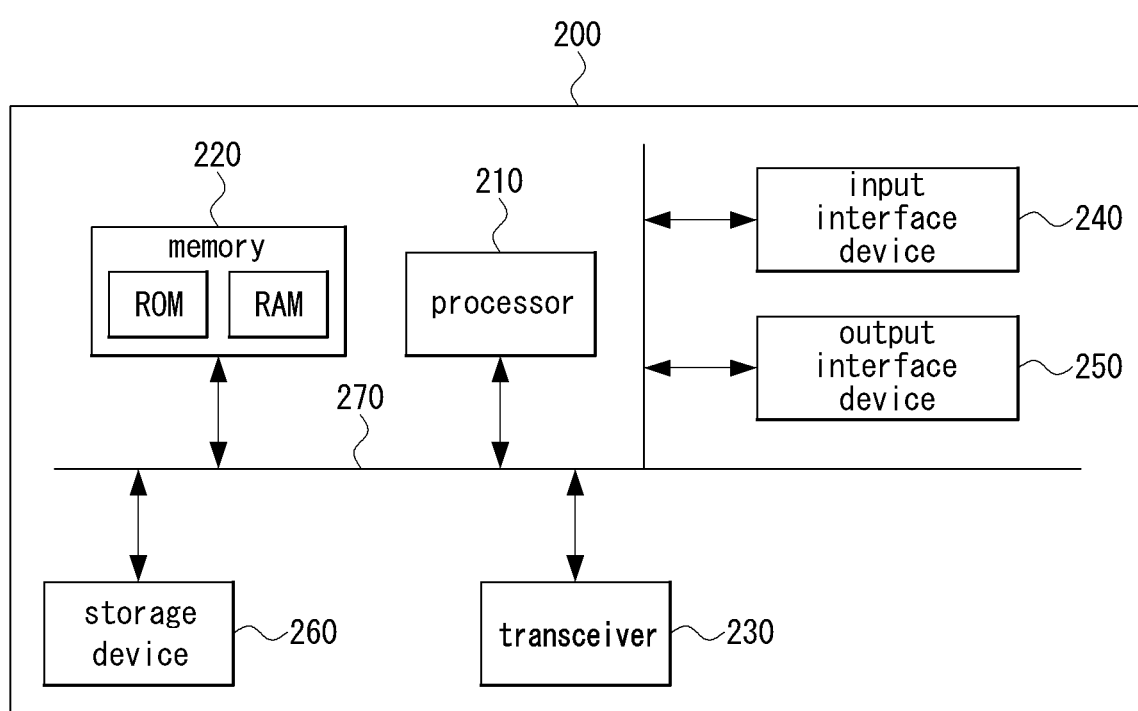
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

A numerology applied to physical signals and channels in the communication system (e.g., NR communication system or 6G communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported.

CP type(s) not listed in Table 1 (e.g., extended CP) may be additionally supported for a specific subcarrier spacing (e.g., 60 kHz).

Table 1 relates to a first exemplary embodiment of a method for configuring numerologies for a CP-OFDM based communication system.

TABLE 1

| Subcarrier spacing | 15 kHz | 30 kHz | 60 kHz | 120 kHz | 240 kHz | 480 kHz |
|---|---|---|---|---|---|---|
| OFDM symbol length [μs] | 66.7 | 33.3 | 16.7 | 8.3 | 4.2 | 2.1 |
| CP length [μs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The subframe may be used as a unit for transmission, measurement, and the like, and the length of the subframe may have a fixed value (e.g., 1 ms) regardless of a subcarrier spacing. A slot may comprise consecutive symbols (e.g., 14 OFDM symbols). The length of the slot may be variable differently from the length of the subframe. For example, the length of the slot may be inversely proportional to the subcarrier spacing.

A slot may be used as a unit for transmission, measurement, scheduling, resource configuration, timing (e.g., scheduling timing, hybrid automatic repeat request (HARQ) timing, channel state information (CSI) measurement and reporting timing, etc.), and the like. The length of an actual time resource used for transmission, measurement, scheduling, resource configuration, etc. may not match the length of a slot. A mini-slot may include consecutive symbol(s), and the length of a mini-slot may be shorter than the length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., the length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beamforming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data channel, control channel, and the like. Resource allocation of a data channel may be performed in units of RBs or RB groups (e.g., resource block group (RBG)). One RBG may include one or more consecutive RBs. Resource allocation of a control channel may be performed in units of control channel elements (CCEs). One CCE in the frequency domain may include one or more RBs.

In the communication system, a slot (e.g., slot format) may be composed of a combination of one or more of downlink period, flexible period (or unknown period), and an uplink period. Each of a downlink period, flexible period, and uplink period may be comprised of one or more consecutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alternatively, a slot may not include a flexible period. The terminal may perform a predefined operation in a flexible period. Alternatively, the terminal may perform an operation configured by the base station semi-statically or periodically. For example, the periodic operation configured by the base station may include a PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing operation in the corresponding flexible symbol (e.g., overridden flexible symbol).

A slot format may be configured semi-statically by higher layer signaling (e.g., radio resource control (RRC) signaling). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in downlink control information (DCI)). The semi-statically configured slot format may be overridden by a dynamically indicated slot format. For example, a semi-static flexible symbol may be overridden by a downlink symbol or an uplink symbol by SFI.

The base station and the terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. RBs constituting one bandwidth part may be consecutive in the frequency domain. One numerology may be used for transmission of signals (e.g., transmission of control channel or data channel) in one bandwidth part. In exemplary embodiments, when used in a broad sense, a 'signal' may refer to any physical signal and channel. A terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. That is, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB). The IRB will be described later.

A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information or a master information block (MIB) transmitted on the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. The terminal may monitor PDCCH candidate(s) for the CORESET configured in the downlink active bandwidth part. Alternatively, the terminal may monitor PDCCH candidate(s) for a CORESET (e.g., CORESET #0) configured in a downlink bandwidth part other than the downlink active bandwidth part. The initial downlink active bandwidth part may include the CORESET #0 and may be associated with the CORESET #0. The CORESET #0 having a quasi-co-location (QCL) relation with an SS/PBCH block may be configured for the terminal in a primary cell (PCell), a secondary cell (SCell), and a primary secondary cell (PSCell). In the secondary cell (SCell), the CORESET #0 may not be configured for the terminal.

In the present disclosure, a set of signals including a synchronization signal may be transmitted to the terminal(s), which may be referred to as a synchronization signal block (SSB). The signals constituting the SSB may be predefined in the technical specification. The synchronization signal included in the SSB may be a primary synchronization signal (PSS), a secondary synchronization signal (SSS), or the like. The SSB may further include the above-described signals (e.g., PBCH, DM-RS for decoding the PBCH, CSI-RS, etc.) in addition to the synchronization signal, and may be repeatedly transmitted through a beam sweeping operation. In the NR communication system, the SSB may refer to a synchronization signal (SS)/PBCH block, and an SSB resource may refer to an SS/PBCH block resource.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH. The terminal may periodically monitor the search space, and may monitor the search space at one or more time positions (e.g., PDCCH monitoring occasions, CORESET) within one period.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with one CORESET. One CORESET may be logically associated with one or more search space sets. A search space set for transmitting a common DCI or a group common DCI may be referred to as a common search space set (hereinafter, referred to as a 'CSS set'). The common DCI or the group common DCI may include at least one of resource allocation information of a PDSCH for transmission of system information, paging, a power control command, SFI, or a pre-emption indicator. In the case of the NR communication system, the common DCI may correspond to DCI formats 0_0, 1_0, etc., and a cyclic redundancy check (CRC) of the common DCI may be scrambled by a system information-radio network temporary identifier (SI-RNTI), paging-RNTI (P-RNTI), random access-RNTI (RA-RNTI), temporary cell-RNTI (TC-RNTI), or the like. The group common DCI may correspond to a DCI format 2_X (X=0, 1, 2, . . . ), or the like, and a CRC of the group common DCI may be scrambled by a slot format indicator-RNTI (SFI-RNTI) or the like. The CSS set may include Type 0, Type 0A, Type 1, Type 2, and Type 3 CSS sets.

A search space set for transmitting a UE-specific DCI may be referred to as a UE-specific search space set (hereinafter, referred to as a 'USS set'). The UE-specific DCI may include scheduling and resource allocation information for a PDSCH, PUSCH, PSSCH, or the like. In the case of the NR communication system, the UE-specific DCI may correspond to DCI formats 0_1, 0_2, 1_1, 1_2, 3_0, 3_1, or the like, and a CRC of the UE-specific DCI may be scrambled by a C-RNTI, configured scheduling-RNTI (CS-RNTI), modulation and coding scheme-C-RNTI (MCS-C-RNTI), or the like. In consideration of scheduling freedom or fallback transmission, a UE-specific DCI may be transmitted even in a CSS set. In this case, the UE-specific DCI may be transmitted according to the DCI format corresponding to the common DCI. For example, the terminal may monitor a PDCCH (e.g., DCI formats 0_0, 0_1) whose CRC is scrambled with a C-RNTI, CS-RNTI, MCS-C-RNTI, or the like in the CSS set.

The Type 0 CSS set may be used for receiving a DCI scheduling a PDSCH including an SIB1, and may be configured through a PBCH or cell-specific RRC signaling. The ID of the Type 0 CSS set may be assigned as or set to 0. The type 0 CSS set may be logically combined with the CORESET #0.

The terminal may assume that a PDCCH DM-RS has a QCL relationship with a certain signal (e.g., SS/PBCH block, CSI-RS, PDSCH DM-RS, PDCCH DM-RS, or the like). In addition, since a PDCCH has the same antenna port as a corresponding PDCCH DM-RS, the PDCCH and the PDCCH DM-RS may have a QCL relationship with each other. Therefore, the terminal may acquire information on large-scale propagation characteristics of a radio channel experienced by the PDCCH and the PDCCH DM-RS through the QCL assumption, and may utilize the information on the large-scale propagation characteristics for channel estimation, reception beamforming, and the like. A QCL parameter may include at least one of a delay spread, Doppler spread, Doppler shift, average gain, average delay, or spatial Rx parameter. The spatial Rx parameter may correspond to at least one characteristic of a reception beam, reception channel spatial correlation, or transmission/reception beam pair. For convenience, the spatial Rx parameter may be referred to as 'spatial QCL'. The PDCCH may be used in a sense including the PDCCH DM-RS, and an expression that the PDCCH has a QCL relationship with a certain signal may include the meaning that the PDCCH DM-RS of the PDCCH has a QCL relationship with the certain signal. A signal having a QCL relationship with the PDCCH or a resource thereof may be referred to as a QCL source, QCL source signal, QCL source resource, or the like.

PDCCHs transmitted in the same CORESET (and a search space set, PDCCH monitoring occasions, etc. corresponding thereto) may have the same QCL relationship. That is, a unit of a set for which the terminal assumes the same QCL may be a CORESET, and the QCL assumption for each of the CORESETs may be independent. In an exemplary embodiment, a QCL, QCL source, etc. of a certain CORESET may mean a QCL, QCL source, etc. of a PDCCH received through the corresponding CORESET, respectively. Exceptionally, different QCL assumptions may be applied to search space sets corresponding to one CORESET. For example, a search space set for monitoring an RA-RNTI (e.g., Type 1 CSS set) and other search space sets may have different QCL relationships.

A QCL relationship or QCL assumption (e.g., QCL source, QCL type, etc.) of a CORESET may be determined by a predefined method. For example, the terminal may assume that a PDCCH DM-RS received through a certain CORESET or a certain search space set has a QCL relationship, with respect to a predefined QCL type, with an SS/PBCH block and/or CSI-RS selected in an initial access or random access procedure. Here, the QCL type may mean a set of one or more QCL parameter(s). Alternatively, a QCL relationship or QCL assumption (e.g., QCL source, QCL type, etc.) of a CORESET may be signaled from the base station to the terminal (e.g., through RRC signaling, medium access control (MAC) control element (CE) signaling, DCI signaling, or a combination thereof). That is, the base station may configure a transmission configuration information (TCI) state for a CORESET to the terminal. In general, the TCI state may include an ID of a signal (e.g., a QCL source or QCL source resource of a PDCCH DM-RS) having a QCL relationship with a DM-RS (e.g., the PDCCH DM-RS) of a physical channel to which the TCI is applied, and/or at least one QCL type thereof. For example, the base station may configure one or more TCI state candidates for each CORESET to the terminal through RRC signaling, and may indicate or configure one TCI state to be used for CORESET monitoring of the terminal from among the one or more TCI state candidates to the terminal through MAC signaling (or DCI signaling). When there is one TCI state candidate configured by RRC signaling, the MAC signaling procedure (or DCI signaling procedure) may be omitted. The terminal may perform PDCCH monitoring and reception operations for the corresponding CORESET based on the TCI state configuration information received from the base station.

In a communication system, beam operations of a high frequency band and a low frequency band may be different from each other. Since a path loss of signals due to a channel is relatively small in a low frequency band (e.g., a band of 6 GHz or below), a signal may be transmitted/received using a beam having a wide beamwidth. In particular, in case of a control channel, the entire coverage of a cell (or sector) may be covered even with a single beam. However, in a high frequency band (e.g., a band of 6 GHz or above) having a large signal path loss, beamforming by a large-scale antenna may be used to extend the coverage. In addition, beamforming may be applied not only to data channels but also to common signals and control channels. A communication node (e.g., base station) may form beams having a small beam width through a plurality of antennas, and transmit and receive a signal multiple times by using a plurality of beams having different directivity to cover the entire spatial area of a cell (or sector). An operation of repeatedly transmitting a signal in a plurality of time resources by using a plurality of beams may be referred to as a beam sweeping operation. A system for transmitting a signal using a plurality of beams having such a narrow beam width may be referred to as a multi-beam system.

For the multi-beam system operation, the base station may manage transmission and reception beams of a terminal. Also, the terminal may manage its own transmission and reception beams. The terminal may measure a beam quality with respect to a signal (e.g., SSB, CSI-RS, etc.) transmitted from the base station or a transmission and reception point (TRP), and may report a measurement result of the beam quality to the base station. For example, the terminal may calculate a beam quality measurement value such as reference signal received power (RSRP) and signal-to-interference-plus-noise ratio (SINR) for each beam (e.g., each signal or resource), and report the optimal beam(s) and measurement value(s) corresponding thereto to the base station. The base station may determine a transmission beam for the terminal based on the beam quality measurement values received from the terminal. In addition, based on the beam quality measurement values received from the terminal, the base station may configure information (e.g., QCL information, TCI state information, etc.) required for the terminal to receive physical signals and channels (e.g., PDCCH, PDSCH, CSI-RS, PUCCH, PUSCH, SRS, PRACH, etc.) to the terminal. In exemplary embodiments, unless otherwise specified, 'beam' may refer to 'transmission beam', 'reception beam', and/or 'transmission/reception beam pair'. Also, the terms 'beam', 'transmission beam', 'reception beam', and 'transmission/reception beam pair' may be used in the same sense. Hereinafter, 'transmission beam' may correspond to 'precoder', 'beamformer', 'transmission spatial filter', and the like, and information on a transmission beam may include information on a precoder, beamformer, transmission spatial filter, transmission spatial relationship information, spatial transmission parameters, and the like corresponding thereto. In addition, 'reception beam' may correspond to 'reception filter', 'reception spatial filter', 'reception beamformer', and the like, and information on a reception beam may include information on a reception filter, reception spatial filter, reception beamformer, or the like, information on a spatial QCL, information on QCL type D, reception spatial relationship information, spatial reception parameters, and the like. Also, hereinafter, 'multi-beam' may mean at least one beam(s).

Figure 3:
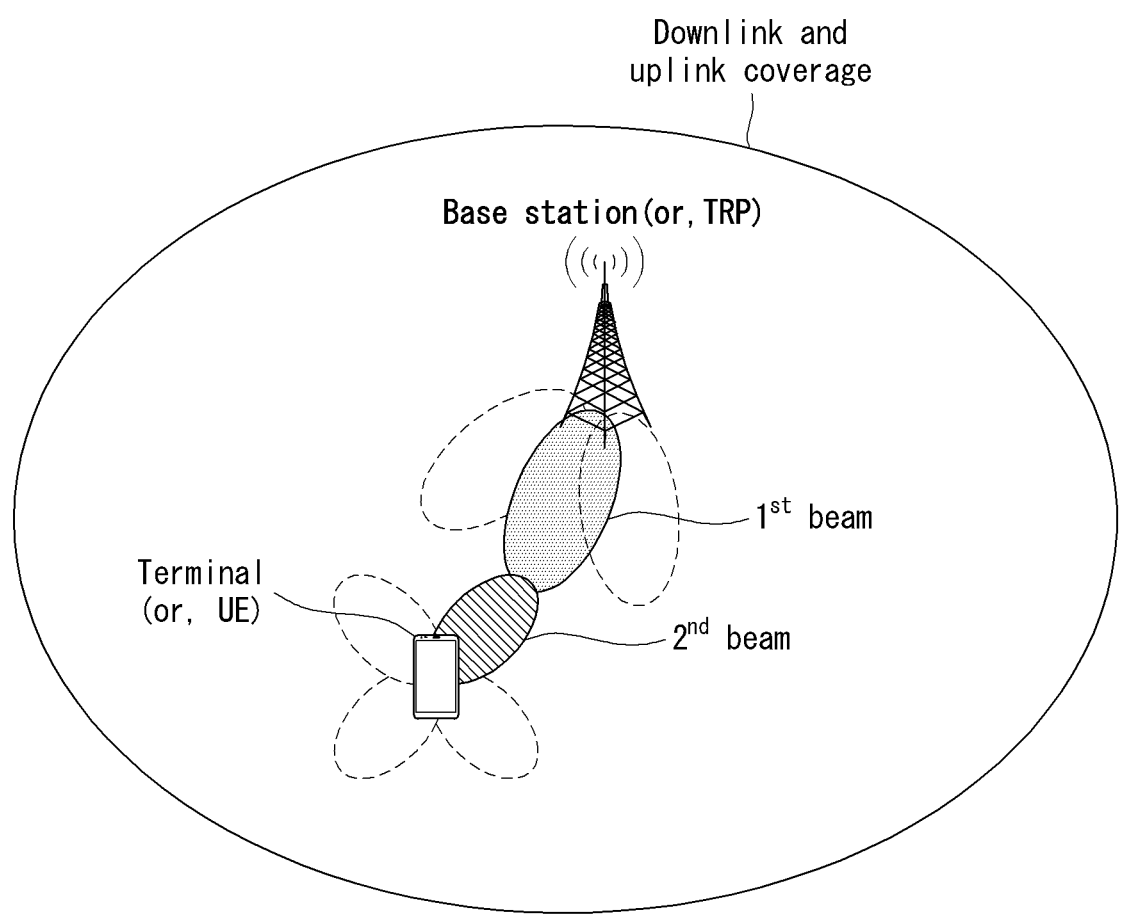
FIG. 3 is a conceptual diagram illustrating a configuration of a communication network and a first exemplary embodiment of a signal transmission method based thereon.

FIG. 3 is a conceptual diagram illustrating a configuration of a communication network and a first exemplary embodiment of a signal transmission method based thereon.

Referring to FIG. 3, a base station or serving cell may include one TRP, and downlink and uplink coverage may be formed by the TRP. A terminal may perform both an operation of receiving a downlink signal from the TRP and an operation of transmitting an uplink signal to the TRP. In this case, beamforming may be applied to downlink reception and uplink transmission. For example, the TRP may apply a first beam to signal transmission/reception with the terminal, and the terminal may apply a second beam to signal transmission/reception with the TRP (or base station). A transmission beam (or transmission spatial filter) of the terminal may be formed based on a reception beam (or, reception spatial filter, beam quality measurement for a received signal) of the terminal. In addition, a transmission beam (or transmission spatial filter) of the base station may be formed based on a reception beam (or, reception spatial filter, beam quality measurement for a received signal) of the base station. That is, beam correspondence may be established between the transmission beam and the reception beam of the communication node.

The base station (or TRP) may transmit synchronization signals, broadcast information, etc. to the terminal(s) by using multiple beams. For example, one or more resources may be defined or configured for transmission of the PSS, SSS, PBCH, SSB, PDCCH, PDSCH, etc., and the signals may be repeatedly transmitted in the one or more resources through a beam sweeping operation. The signals may be referred to as initial access signals. The terminal may determine a resource for receiving an initial access signal and/or a beam corresponding thereto from among the one or more resources, and may receive an initial access signal from the determined resource (based on the determined beam). For example, the terminal may determine a resource having the largest received signal strength measurement value (e.g., RSRP) for the initial access signal as a reception resource, and may determine a corresponding beam as a reception beam of the initial access signal. The terminal may receive the initial access signal and obtain a cell identifier (ID), downlink timing, broadcast information or system information (e.g., MIB, SIB), and the like.

The terminal may perform a random access procedure based on the reception resource and/or beam of the initial access signal.

Figure 4:
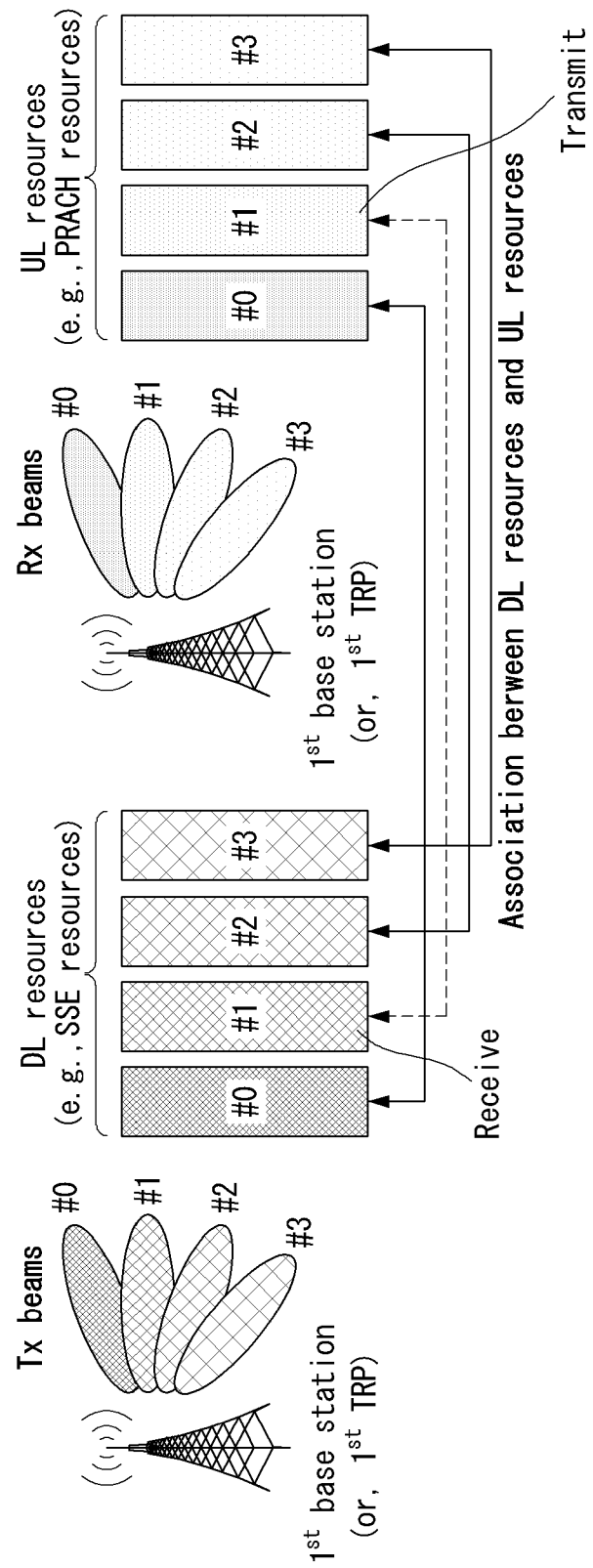
FIG. 4 is a conceptual diagram illustrating a first exemplary embodiment of an initial access method based on association between downlink resource(s) and uplink resource(s).

FIG. 4 is a conceptual diagram illustrating a first exemplary embodiment of an initial access method based on association between downlink resource(s) and uplink resource(s).

Referring to FIG. 4, downlink resource(s) (e.g., downlink resource(s) for initial access) and uplink resource(s) (e.g., uplink resource(s) for random access) may be associated with each other. For example, the downlink resource(s) may be SSB transmission resource(s). In addition, the uplink resource(s) may be PRACH transmission resource(s). As described above, the base station may repeatedly transmit the initial access signal through multiple beams using the downlink resource(s). In the present exemplary embodiment, the terminal may receive the initial access signal (e.g., SSB or CSI-RS) in a downlink resource #1 (e.g., SSB resource #1 or CSI-RS resource #1) which is one of four downlink resources (e.g., SSB resources or CSI-RS resources).

The base station may configure the downlink resource(s) and the uplink resource(s) to the terminal (e.g., the terminal may receive configuration information of the downlink resource(s) and the uplink resource(s)), and the terminal may receive information on an association relationship between the uplink resource(s) and the downlink resource(s) from the base station. Each of the uplink resource(s) may be associated with one or more downlink resource(s). That is, the downlink resource(s) and the uplink resource(s) may correspond one-to-one or many-to-one. Alternatively, a plurality of uplink resource(s) may be associated with one downlink resource. That is, the downlink resource(s) and the uplink resource(s) may correspond one-to-many. Referring to FIG. 4, the terminal may be configured with four SSB resources and four PRACH resources. In addition, an association relationship may be established between the four SSB resources and the four PRACH resources. For example, SSB resources #0, #1, #2, and #3 may be associated with PRACH resources #0, #1, #2, and #3, respectively.

The terminal may transmit a PRACH in an uplink resource mutually associated with the downlink resource in which the initial access signal is received. Referring to FIG. 4, the terminal may transmit a PRACH in a PRACH resource #1 associated with the downlink resource #1 (e.g., SSB resource #1 or CSI-RS resource #1) in which the initial access signal (e.g., SSB or CSI-RS) is received. In this case, a transmission beam of the PRACH may be generated based on a reception beam of the initial access signal (e.g., SSB or CSI-RS). In addition, a resource or beam of another uplink signal for random access (e.g., Msg3 PUSCH, MsgA PUSCH, PUCCH including a HARQ response message for Msg4, or the like) may be determined based on the downlink resource or beam in which the terminal receives the initial access signal (e.g., SSB or CSI-RS) or the uplink resource or beam in which the terminal transmits the PRACH. This method described above may be referred to as (Method 100).

In the present disclosure, a PRACH resource may mean a PRACH occasion (or PRACH occasion resource). A random access preamble (or sequence) may be mapped to a PRACH resource one or more times, and a PRACH resource may further include a cyclic prefix (CP), a guard period, and the like. A PRACH resource (i.e., PRACH occasion) may include a time resource (e.g., symbol(s)) and a frequency resource (e.g., RB(s) or subcarrier(s)), and may further include a code resource or sequence resource (e.g., PRACH sequence(s) or PRACH preamble(s)). A PRACH resource may be arranged in one or more slot(s) and may include one or more symbol(s). In addition, a PRACH resource may include one or more RB(s) or subcarrier(s). Also, a plurality of PRACH resources (i.e., a plurality of PRACH occasions) may be mapped to the same time-frequency resource. The PRACH resources (i.e., PRACH occasions) mapped to the same time-frequency resource may be distinguished by different codes or sequences. One PRACH resource or one PRACH occasion may include one or more PRACH preamble(s) (or sequence(s)). For example, one PRACH resource or one PRACH occasion may include PRACH preamble(s) (or sequence(s)) mapped to the same time-frequency resource. In addition, a plurality of PRACH resources or a plurality of PRACH occasions may include different sets of PRACH preamble(s) (or sequence(s)) mapped to the same time-frequency resource, respectively.

Meanwhile, a multi-beam may be formed by a plurality of TRPs and/or panels. Hereinafter, a TRP and a panel may be collectively referred to as TRP. TRPs may be disposed based on different spatial locations, antenna shapes, radiation directions, and the like. Accordingly, different beams (e.g., transmission beams, reception beams, and transmission/reception beam pairs) may be formed in the respective channels formed between the TRPs and the terminal. The base station may perform multi-beam transmission using multiple TRPs, and transmission reliability may be improved by a beam selection gain or a beam diversity gain. The multiple TRP transmission scheme may be referred to as coordinated multipoint (CoMP). TRPs participating in the multiple TRP transmission may belong to the same base station or the same serving cell. Alternatively, TRPs participating in the multiple TRP transmission may belong to different base stations or different serving cells. As a backhaul environment between the TRPs, an ideal backhaul and a non-ideal backhaul may be considered. It may be difficult to apply joint scheduling between the TRPs connected by non-ideal backhaul links.

As in the exemplary embodiment of FIG. 3, the base station or serving cell may be configured with TRP(s) that perform both a transmission operation and a reception operation. On the other hand, the base station or the serving cell may include at least some TRP(s) for performing either one of a transmission operation and a reception operation. More precisely, a TRP performing only a transmission operation may be referred to as a transmission point (TP), and a TRP performing only a reception operation may be referred to as a reception point (RP). Hereinafter, when a TRP performs only a transmission operation or a reception operation, the TRP may be interpreted as a TP or RP. In the above case, TRP(s) forming the downlink coverage and TRP(s) forming the uplink coverage may be different from each other, and the downlink coverage and the uplink coverage may be asymmetric to each other.

Figure 5A:
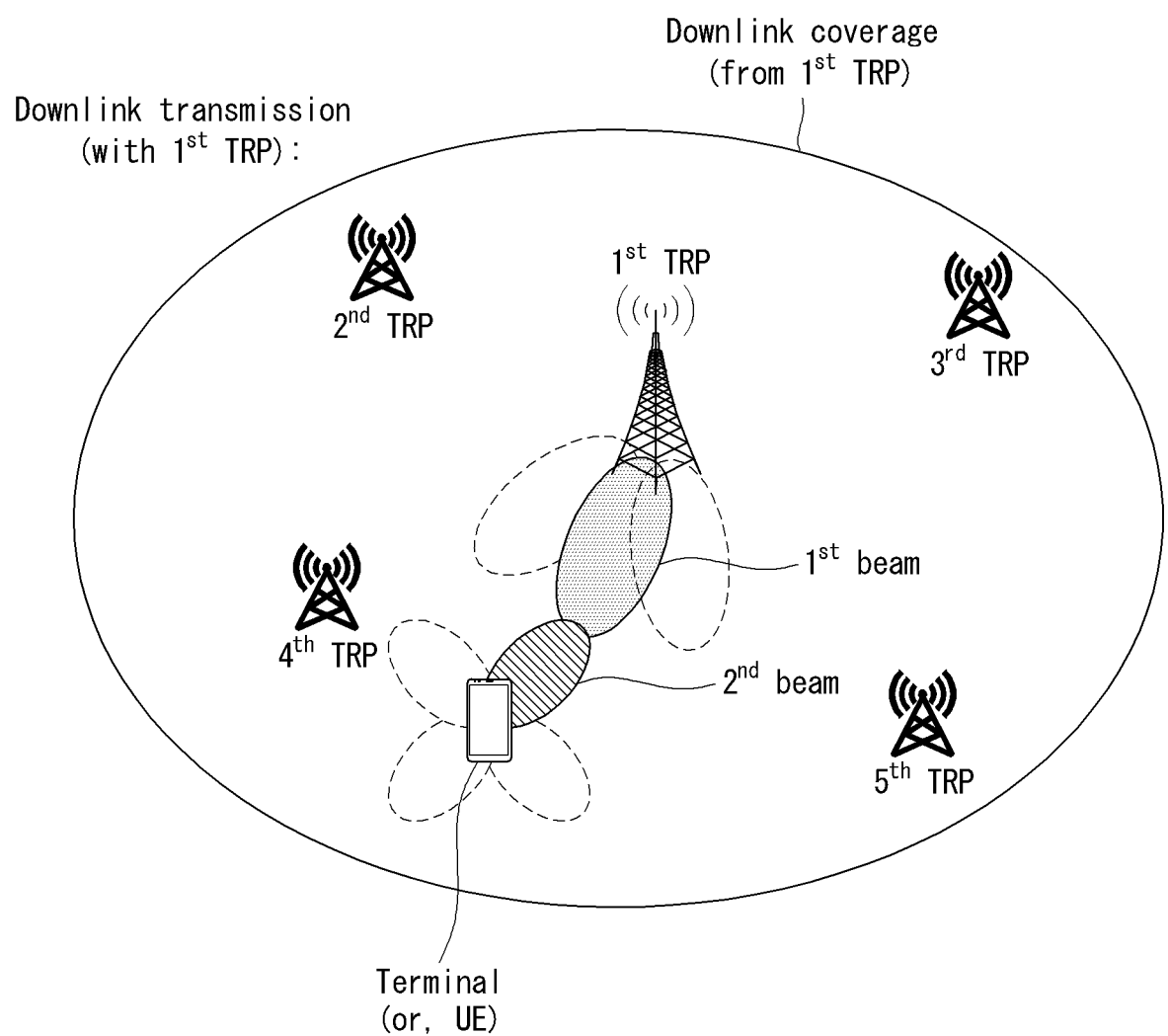
FIGS. 5A and 5B are conceptual diagrams illustrating a configuration of an asymmetric UL/DL network using multiple TRPs and a first exemplary embodiment of a signal transmission method based thereon.
Figure 5B:
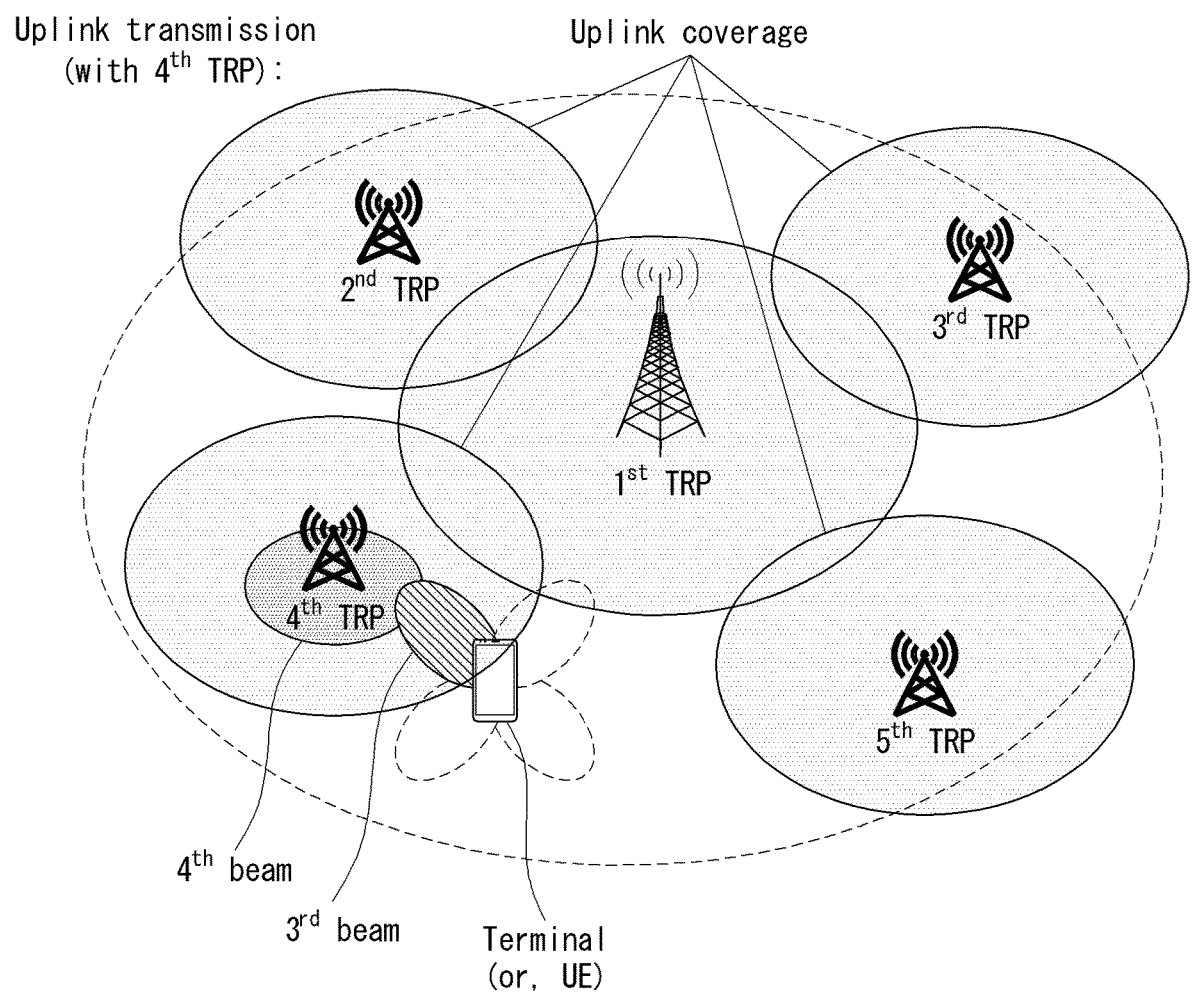

FIGS. 5A and 5B are conceptual diagrams illustrating a configuration of an asymmetric UL/DL network using multiple TRPs and a first exemplary embodiment of a signal transmission method based thereon.

Referring to FIGS. 5A and 5B, a base station or serving cell may include a plurality of TRPs. Among the plurality of TRPs, some TRPs (e.g., the first TRP) may perform both a transmission operation and a reception operation, and some other TRPs (e.g., the second to fifth TRPs) may perform only a reception operation. A downlink coverage of the base station or serving cell may be formed by the first TRP, and an uplink coverage may be formed by the first to fifth TRPs. A terminal may receive a downlink signal from the first TRP, and may transmit an uplink signal to the first to fifth TRPs.

In the case of downlink transmission, the base station (e.g., the first TRP) may transmit a signal using a first beam and the terminal may receive the signal using a second beam. In the case of uplink transmission, the terminal may transmit a signal using a third beam and the base station (e.g., the fourth TRP) may receive the signal using a fourth beam. In this case, a transmission beam (or transmission spatial filter) of the terminal may be formed or determined independently of a reception beam (or, reception spatial filter, beam quality measurement for a received signal) of the terminal. For example, the third beam that is the transmission beam of the terminal may be different from the second beam that is the reception beam of the terminal. In addition, a transmission beam (or transmission spatial filter) of the base station may be formed or determined independently of a reception beam (or, reception spatial filter, beam quality measurement for a received signal) of the base station. For example, the first beam that is the transmission beam of the base station for the terminal may be different from the fourth beam that is the reception beam from the same terminal. In addition, the TRP for transmitting the downlink signal and the TRP for receiving the uplink signal may be different from each other. In this manner, beam correspondence may not be established between the transmission beam and the reception beam of the communication node.

An initial access procedure of the terminal may be performed based on the above-described asymmetric UL/DL network. In the exemplary embodiment of FIGS. 5A and 5B, the terminal may receive a downlink initial access signal from the base station (e.g., the first TRP). In addition, the terminal may transmit a random access uplink signal to the base station. In this case, the random access uplink signal may be received by a TRP (e.g., the fourth TRP) different from the first TRP. Also, as described above, a correspondence may not exist between a beam of the initial access signal and a beam of the random access uplink signal.

Therefore, it may be difficult for the terminal to select a specific resource or a specific beam to transmit the random access uplink signal.

As a method for solving the above-described problem, the random access uplink signal may be repeatedly transmitted based on multiple beams. That is, a plurality of (i.e., one or more) resources may be defined or configured for the random access uplink signal, and the terminal may repeatedly transmit the random access uplink signal in the plurality of resources. In this case, the same beam or different beams may be applied to repeatedly transmitted random access uplink signals. For example, the random access uplink signal may be transmitted in a beam-sweeping scheme. For example, the random access uplink signal may be a PRACH. The base station may configure N PRACH resources to the terminal (N is a natural number), and the terminal may transmit PRACHs in M resource(s) among the N PRACH resources (M is a natural number less than or equal to N). In some exemplary embodiments, M=N. That is, the terminal may transmit the PRACHs in all PRACH resources configured by the base station. The repeatedly transmitted PRACHs may be the same signal (e.g., a preamble having the same ID, the same sequence). This method described above may be referred to as (Method 110).

In (Method 110), transmission beam(s) used for the repeated transmission of the random access uplink signal (e.g., PRACH) may be arbitrarily formed or determined by the terminal. Additionally or alternatively, the transmission beam(s) used for the repeated transmission of the random access uplink signal (e.g., PRACH) may include at least a portion of beam(s) used for receiving the initial access downlink signal, or may be formed based on the beam(s) used for receiving the initial access downlink signal.

Figure 6:
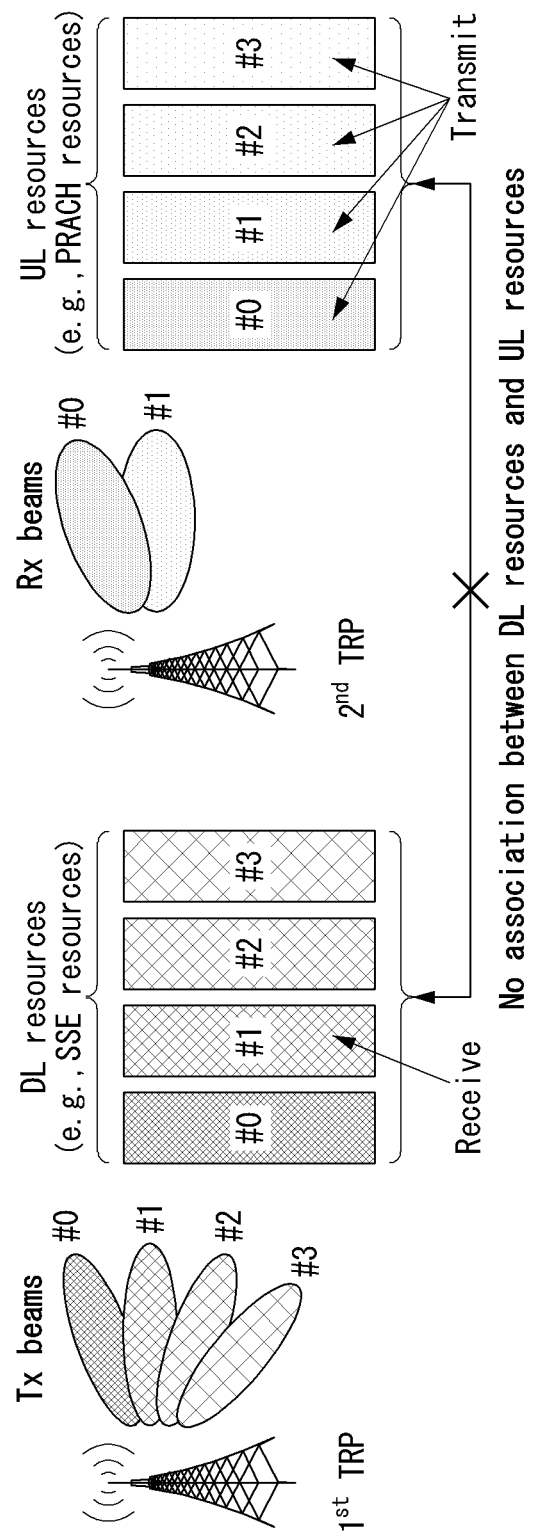
FIG. 6 is a conceptual diagram illustrating a first exemplary embodiment of an initial access method based on uplink beam sweeping.

FIG. 6 is a conceptual diagram illustrating a first exemplary embodiment of an initial access method based on uplink beam sweeping.

Referring to FIG. 6, a terminal may be configured by a base station to have downlink resource(s) (e.g., downlink resource(s) for initial access) and uplink resource(s) (e.g., uplink resource(s) for random access). For example, the terminal may be configured with four SSB resources and four PRACH resources (N=4). In the exemplary embodiment of FIG. 6, transmission beams #0 to #3 of the base station (e.g., the first TRP) may correspond to downlink resources #0 to #3 (or SSB resources #0 to #3). For example, the base station may transmit the SSB resources #0 to #3 based on the transmission beams #0 to #3, respectively. In addition, reception beams #0 and #1 of the base station (e.g., the second TRP) may correspond to uplink resources #0 to #3 (or PRACH resources #0 to #3). For example, the base station (e.g., the second TRP) may receive the PRACH resources #0 and #1 based on the reception beam #0, and may receive the PRACH resources #2 and #3 based on the reception beam #1.

(Method 110) may be applied to the present exemplary embodiment. That is, the terminal may repeatedly transmit a random access uplink signal in the uplink resource(s). In this case, the same beam or different beams may be applied to the repeatedly transmitted random access uplink signals. For example, the terminal may repeatedly transmit the PRACH in at least some of the four PRACH resources. In case that M=N=4, the terminal may repeatedly transmit the PRACH four times by using all four PRACH resources. In this case, the resource(s) through which the terminal transmits the PRACH may be determined regardless of the downlink resource from which the terminal receives the initial access signal (e.g., SSB or CSI-RS). For example, the terminal may receive an SSB in the SSB resource #1. The terminal may determine resource(s) for transmitting a PRACH regardless of the reception resource, and may transmit the PRACH in the determined resource(s). In addition, a transmission beam of the PRACH may be arbitrarily determined by the terminal regardless of the reception beam of the initial access signal. The SSB may be transmitted from the first TRP, and the PRACH may be received by the second TRP. As described above, the second TRP may be the same as or different from the first TRP.

In this case, the association relationship between the downlink resource(s) for initial access and the random access uplink resource(s) may be unnecessary. Therefore, when (Method 110) is used, downlink resource(s) (e.g., downlink resource(s) for initial access, SSB resource(s), CSI-RS resource(s)) and uplink resource(s) (e.g., uplink resource(s) for random access, PRACH resource(s)) may not be associated with each other. The terminal may not receive information on the association relationship from the base station, or may receive information indicating that there is no association relationship. Alternatively, as described above, configuration in which there is no association relationship between downlink resources and random access uplink resources for repeated transmissions may be equivalent to configuration in which random access uplink resources for repeated transmissions are associated with each of a plurality of downlink resources. For example, in the above exemplary embodiment, the terminal may be configured to associate each of the SSB resources #0 to #3 with the same PRACH resources, that is, the PRACH resources #0 to #3. The terminal may perform repeated PRACH transmissions using the same PRACH resources, i.e., the PRACH resources #0 to #3, regardless of which SSB resource is determined from among the SSB resources #0 to #3 based on the configuration.

The above-described random access signal transmission method (e.g., (Method 110)) may or may not be performed depending on a case. The base station may indicate to the terminal whether or not to apply the above-described method (e.g., (Method 110)). When (Method 110) is not applied, the terminal may perform the random access operation based on another method (e.g., (Method 100)). For example, the base station may transmit configuration information indicating whether (Method 110) is applied to the terminal. Alternatively, the base station may transmit configuration information instructing the terminal to apply any one of (Method 100) and (Method 110). The configuration information indicated by the base station to the terminal may be determined based on capability information reported by the terminal to the base station. The capability information may include information on whether to support the repeated transmission operation of the random access uplink signal (e.g., PRACH) based on a single beam and/or multiple beams. In addition, the configuration information indicated by the base station to the terminal may be determined based on whether a beam correspondence (or QCL relationship) between SSB reception beam(s) and PRACH transmission beam(s) is established in the terminal. Information on whether the beam correspondence (or QCL relationship) is established may be included in the capability information of the terminal.

In this case, the signaling may be signaling that explicitly indicates to apply the above-described method. For example, the configuration information may include information instructing the terminal to repeatedly transmit an uplink signal (e.g., PRACH), information instructing the terminal to apply multiple beams to the uplink signal (e.g., PRACH), information instructing the terminal to transmit the uplink signal (e.g., PRACH) by beam sweeping, and/or the like. Alternatively, the signaling may be signaling that implicitly indicates to apply the above-described method. For example, the configuration information may include information on an association relationship between downlink resource(s) (e.g., downlink resource(s) for initial access, SSB resource(s), CSI-RS resource(s)) and uplink resources (e.g., uplink resource(s) for random access, PRACH resource(s)), information indicating to use the association relationship, information indicating whether the association relationship is applied, and/or the like. The terminal may perform the above-described random access operation based on the information.

As another example of implicit signaling, the base station may inform the terminal of information on M PRACH resource(s) through which the terminal is to transmit the PRACH (e.g., a value of M, positions of the M resource(s)). The information may be transmitted to the terminal together with configuration information of N PRACH resource(s). When M=1, the terminal may not perform the above-described repeated PRACH transmission operation, and may transmit the PRACH based on (Method 100). In addition, the terminal may transmit the PRACH by using the association relationship between the downlink resource(s) (e.g., SSB resource(s), CSI-RS resource(s)) and the uplink resource(s) (e.g., PRACH resource(s)). On the other hand, when M>1, the terminal may perform the above-described repeated PRACH transmission operation, and may transmit the PRACH based on (Method 110). In addition, the terminal may transmit the PRACH without using the association relationship between the downlink resource(s) (e.g., SSB resource(s), CSI-RS resource(s)) and the uplink resource(s) (e.g., PRACH resource(s)). Alternatively, the terminal may repeatedly transmit the PRACH in uplink resources associated with the downlink resource determined by the terminal.

The M PRACH resource(s) may be configured by the base station. Alternatively, the M PRACH resource(s) may be determined based on a predefined rule. For example, M resource(s) having the lowest index(es) among the N PRACH resource(s) may be determined as the M PRACH resource(s) through which the terminal transmits the PRACH. The above method may be applied when M<N. Alternatively, the number M of repeated transmissions of the PRACH may be determined by the terminal. In addition, the M PRACH resource(s) may be determined by the terminal. The terminal may arbitrarily select the M PRACH resource(s) from among the N PRACH resource(s) configured by the base station, and may transmit the PRACH in the selected resource(s). Additionally or alternatively, a different value of M may be applied for each PRACH resource period. The terminal may perform repeated PRACH transmissions a different number of times within each of a first PRACH resource period and a second PRACH resource period. Here, the M PRACH resource(s) may be at least some of valid PRACH resources. The validity of the PRACH resource will be described later.

Meanwhile, the terminal may receive a downlink signal from the base station after transmitting the random access uplink signal (e.g., PRACH). In this case, the terminal may receive the downlink signal based on specific beam(s). When there is no association relationship between the initial access downlink signal (e.g., SSB or CSI-RS) and the random access uplink signal (e.g., PRACH), or when a plurality of initial access downlink resources are associated with the same random access uplink resource set, it may be difficult for the base station and the terminal to determine the specific beam(s) to transmit or receive the downlink signal. Even after the base station successfully detects the random access uplink signal (e.g., PRACH), it may have to repeatedly transmit the downlink signal for the corresponding terminal based on multiple beams in a plurality of downlink resources.

As a method for solving the above-described problem, a random access uplink signal(s) (hereinafter referred to as TRACH resource(s)') associated with each initial access downlink signal (hereinafter referred to 'SSB') or each initial access downlink signal resource (hereinafter referred to as 'SSB resource') may be distinguished. In the present disclosure specification, 'SSB' and 'SSB resource' may be used interchangeably. For example, a first SSB resource may be associated with a first PRACH resource set, and a second SSB resource may be associated with a second PRACH resource set. When the first SSB resource and the second SSB resource are different from each other, the first PRACH resource set and the second PRACH resource set may be different from each other. Specifically, the first PRACH resource set and the second PRACH resource set may be disjoint sets. That is, PRACH resources belonging to the first PRACH resource set may not belong to the second PRACH resource set, and PRACH resources belonging to the second PRACH resource set may not belong to the first PRACH resource set.

Figure 7:
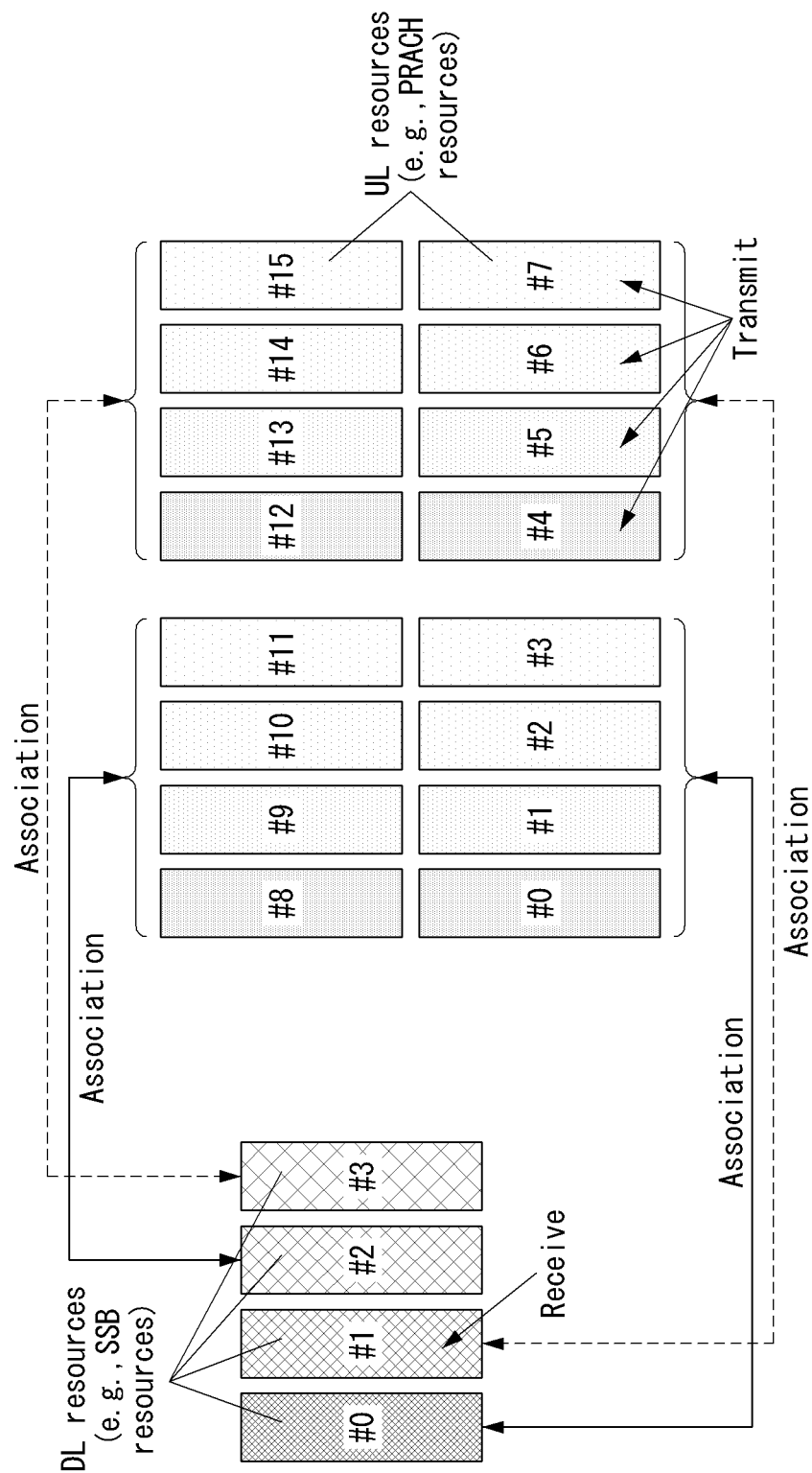
FIG. 7 is a conceptual diagram illustrating a first exemplary embodiment of a method for association between downlink resource(s) and uplink resource(s).

FIG. 7 is a conceptual diagram illustrating a first exemplary embodiment of a method for association between downlink resource(s) and uplink resource(s).

Referring to FIG. 7, SSB resources configured to the terminal may include four SSB resources, that is, SSB resources #0 to #3. In addition, PRACH resources configured to the terminal may include sixteen PRACH resources, that is, PRACH resources #0 to #15. By the above-described method, different PRACH resource sets may be associated with the respective SSB resources. For example, the SSB resource #0 may be associated with the PRACH resources #0 to #3, the SSB resource #1 may be associated with the PRACH resources #4 to #7 other than the four PRACH resources, the SSB resource #2 may be associated with the PRACH resources #8 to #11 other than the eight PRACH resources, and the SSB resource #3 may be associated with the PRACH resources #12 to #15 other than the twelve PRACH resources. In the exemplary embodiment of FIG. 7, each of the PRACH resources (or PRACH occasions) may be identified by at least one of a time resource, a frequency resource, and a preamble (or sequence). For example, PRACH occasion sets associated with different SSBs may be mapped to different time-frequency resources, and may be mapped to the same PRACH preamble set or may be mapped to different PRACH preamble sets. Alternatively, PRACH occasion sets associated with different SSBs may be mapped to the same time-frequency resource and may be mapped to different PRACH preamble sets. For example, in the above exemplary embodiment, each of the PRACH occasions #0 to #3 associated with the SSB #0 may be mapped to the same time-frequency resource with each of the PRACH occasions #4 to #7 associated with the SSB #1, and may be mapped to a different PRACH preamble set. In addition, when different transmission beams are applied to PRACH occasions in which repeated transmissions are performed (e.g., N PRACH occasions or M PRACH occasions), the PRACH occasions may be mapped to at least different time resources (e.g., different slots, different symbol sets). For example, the PRACH occasions #0 to #3 associated with the SSB #0 may be mapped to different slots or different symbol sets.

In addition, by the above-described method, each SSB resource may be associated with a plurality of PRACH resources. The terminal may repeatedly transmit the PRACH in PRACH resources associated with a specific SSB resource. The specific SSB resource may be an SSB resource selected by the terminal in the initial access process, and may be an SSB resource corresponding to an SSB having the highest received signal strength or the highest beam quality. For example, the terminal may determine the SSB #1 or SSB resource #1 as the optimal SSB. In this case, the terminal may repeatedly transmit the PRACH according to the above-described method by using at least a portion of the PRACH resources associated with the SSB resource #1, that is, the PRACH resources #4 to #7. That is, the aforementioned repeated PRACH transmission of the terminal may be performed for at least some of the PRACH resources associated with the same SSB resource (e.g., the SSB determined or selected by the terminal).

The base station may successfully detect the PRACH(s) transmitted by the terminal, and may identify the SSB resource determined by the terminal based on the association relationship. For example, the base station may receive the PRACH(s) transmitted by the terminal in at least some of the PRACH resources #4 to #7. In this case, the base station may determine that the SSB resource #1, which is the SSB resource associated with the PRACH resources #4 to #7, or the SSB #1, which is the corresponding SSB, is the SSB determined by the terminal. In addition, after receiving the PRACH, the base station may transmit a downlink signal (e.g., Msg2, MsgB, Msg4, PDCCH, PDSCH, CSI-RS, etc.) to the terminal based on the SSB resource #1, which is the SSB resource associated with the received PRACH, or a beam (e.g., spatial QCL, etc.) used for transmission of the SSB #1.

After transmitting the PRACH(s), the terminal may receive the downlink signal (e.g., Msg2, MsgB, Msg4, PDCCH, PDSCH, CSI-RS, etc.) based on the beam (or spatial QCL, etc.) used for reception of the SSB resource #1 associated with the PRACH(s) or the SSB #1. That is, the terminal may assume that the downlink signal or DM-RS therefor is quasi-co-located (QCLed) (e.g., spatial QCL, QCL type D) with the determined SSB, that is, the SSB #1 or a synchronization signal or DM-RS included therein. The terminal may receive the downlink signal in an RRC idle mode.

In the above exemplary embodiment, the association relationship between the SSB (or SSB resource) and the PRACH (or PRACH resource) may be used to determine a QCL relationship for receiving the downlink signal (e.g., downlink signal after the PRACH or Msg1 transmission) of the terminal (i.e., to determine the SSB which is a QCL source). For example, the terminal may assume that a DM-RS of a PDCCH and/or PDSCH including Msg2 (or random access response) or Msg4 is QCLed (e.g., spatially QCLed) with the SSB associated with the PRACH resource(s) in which the PRACH is transmitted, and may receive the PDCCH and/or PDSCH based on the QCL assumption. In addition, the terminal may assume that a DM-RS of a PDCCH and/or PDSCH is QCLed with the SSB associated with the PRACH resource(s) in which the PRACH is transmitted in an RRC connected mode after the random access procedure is completed, may receive the PDCCH and/or PDSCH based on the QCL assumption.

In the above exemplary embodiment, a beam correspondence may not be established between the transmission beam and the reception beam of the terminal, and the terminal may (arbitrarily) determine the transmission beam (or transmission spatial relation information, spatial QCL, etc.) of the PRACH not based on the association relationship between the SSB (or SSB resource) and the PRACH (or PRACH resource). On the other hand, the above-described repeated PRACH transmission method may be easily applied to the operating environment in which the beam correspondence is established as shown in FIG. 3. For example, when the beam correspondence is established between the transmission beam and the reception beam of the terminal, the terminal may be configured with the association relationship between downlink resources and random access uplink resources as in the above exemplary embodiments. The terminal may select an SSB resource in an initial access process by the above-described method, and may repeatedly transmit a PRACH in PRACH resources associated with the selected SSB resource. However, in this case, the terminal may determine PRACH transmission beam(s) based on a reception beam of the SSB selected based on the beam correspondence.

Figure 8A:
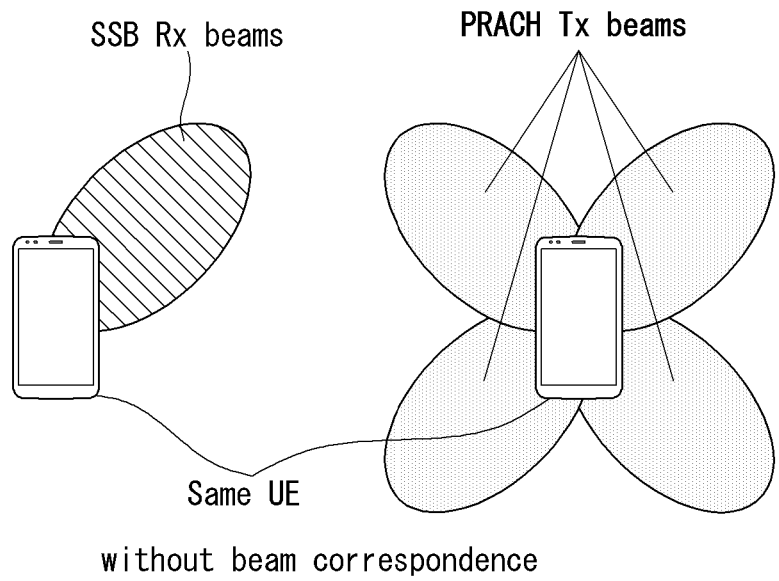
FIG. 8A is a conceptual diagram illustrating a first exemplary embodiment of a method for determining a PRACH transmission beam.
Figure 8B:
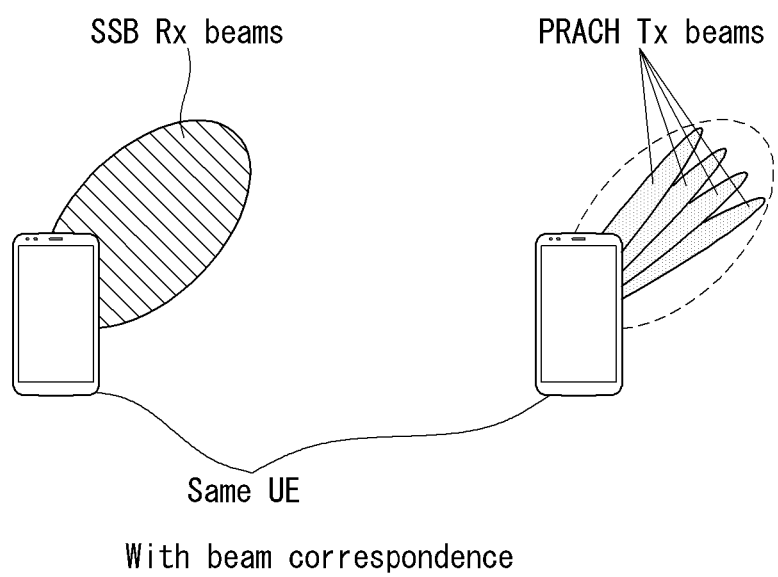
FIG. 8B is a conceptual diagram illustrating a second exemplary embodiment of a method for determining a PRACH transmission beam.

FIG. 8A is a conceptual diagram illustrating a first exemplary embodiment of a method for determining a PRACH transmission beam, and FIG. 8B is a conceptual diagram illustrating a second exemplary embodiment of a method for determining a PRACH transmission beam.

Referring to FIGS. 8A and 8B, the terminal may receive an SSB based on a reception beam, and may repeatedly transmit a PRACH in PRACH resources (or PRACH occasions) associated with the received SSB. In this case, as described above, an operation of determining a PRACH transmission beam may be determined by whether a beam correspondence is established. In the case of FIG. 8A, a beam correspondence between transmission beam(s) and the reception beam of the terminal may not be established, and in this case, the terminal may determine the PRACH transmission beam(s) not based on the associated SSB reception beam. On the other hand, in the case of FIG. 8B, a beam correspondence between the transmission beam(s) and the reception beam of the terminal may be established, and in this case, the terminal may determine the PRACH transmission beam(s) based on the associated SSB reception beam. For example, each of the PRACH transmission beams may have a QCL (e.g., spatial QCL) relationship with the SSB reception beam that is associated therewith.

The above-described terminal operations may be selectively applied by the base station. The terminal may receive, from the base station, information indicating whether to apply the association relationship with the initial access downlink signal (e.g., SSB) to transmission of the random access uplink signal (e.g., PRACH), and based on the indication, the terminal may transmit the random access uplink signal (e.g., PRACH) with or without applying the association relation. Additionally or alternatively, the terminal may receive, from the base station, information indicating whether to apply a beam correspondence with the initial access downlink signal (e.g., SSB) to the transmission of the random access uplink signal (e.g., PRACH), and based on the indication, the terminal may form a transmission beam of the random access uplink signal (e.g., PRACH) with or without applying the beam correspondence (i.e., QCL relationship), and transmit the random access uplink signal (e.g., PRACH). The above-described indication information may be configured by higher layer signaling (e.g., RRC signaling, SIB, MAC CE, etc.) or may be indicated by physical layer signaling (e.g., DCI).

Meanwhile, an association relationship different from that for a terminal performing repeated PRACH transmissions may be established for a terminal that cannot perform the above-described repeated PRACH transmissions. For example, in the above exemplary embodiment, a terminal that does not perform repeated PRACH transmissions may be configured with four PRACH resources, for example, PRACH resources #0, #4, #8, and #12 (or PRACH resource #0, #5, #10, #15). The PRACH resources #0, #4, #8, and #12 (or PRACH resources #0, #5, #10, #15) may be associated with SSB resources #0, #1, #2, and #3, respectively. That is, the SSB resources and the PRACH resources may correspond one-to-one. When the index of the PRACH resource is numbered preferentially in the time domain rather than the frequency domain, the terminal may regard the above PRACH resources #0, #4, #8, and #12 as PRACH resources #0, #1, #2, and #3. When the index of the PRACH resource is numbered preferentially in the frequency domain rather than the time domain, the terminal may regard the above PRACH resources #0, #8, #4, and #12 as PRACH resources #0, #1, #2, and #3. The terminal may transmit the PRACH in a PRACH resource (e.g., PRACH resource #4) associated with the (optimal) SSB resource (e.g., SSB resource #1) determined by the terminal. In this case, the terminal may determine a transmission beam (or transmission spatial relation information, spatial QCL, etc.) of the PRACH based on the association relationship between the SSB (or SSB resource) and the PRACH (or PRACH resource). According to the above-described method, the base station may signal information regarding different PRACH resource configurations to a terminal performing repeated PRACH transmissions and a terminal not performing repeated PRACH transmissions. In this case, an index for the same PRACH resource may be recognized differently by the terminals. The terminal may report information on whether or not it has capability to perform the above-described repeated PRACH transmission operation to the base station.

As a method different from the above-described method, the base station may signal configuration information on a first PRACH resource set to a terminal that does not perform repeated PRACH transmissions, and may signal additional information (i.e., configuration information on a second PRACH resource set) to a terminal that performs repeated PRACH transmissions as well as the configuration information on the first PRACH resource set. That is, the terminal may determine positions of PRACH resources based on a combination of the configuration information on the first PRACH resource set and the configuration information on the second PRACH resource set, and may determine an association relationship between the PRACH resources and the SSB resources. For example, the configuration information on the first PRACH resource set and the configuration information on the second PRACH resource set may be included in different RRC messages (e.g., different RRC parameters) and transmitted to the terminal.

Figure 9:
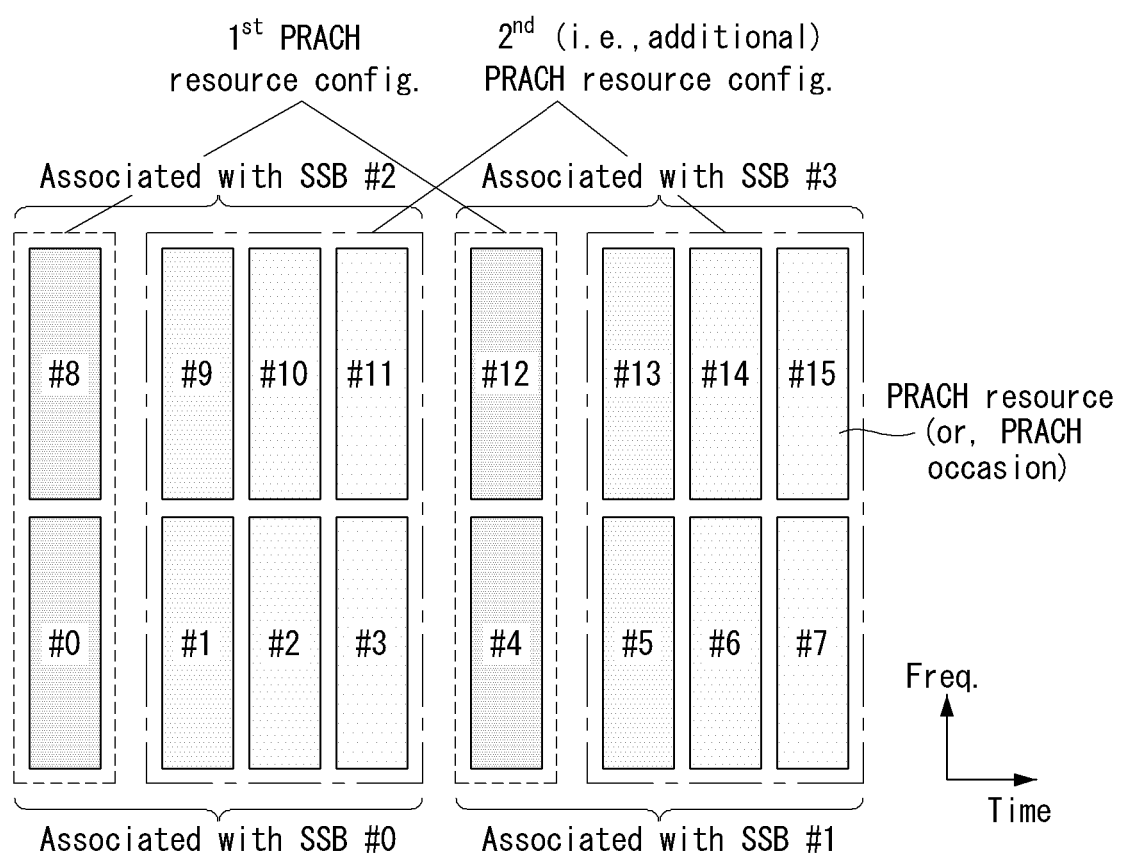
FIG. 9 is a conceptual diagram illustrating a first exemplary embodiment of a method for signaling information on PRACH resource configuration.
Figure 10:
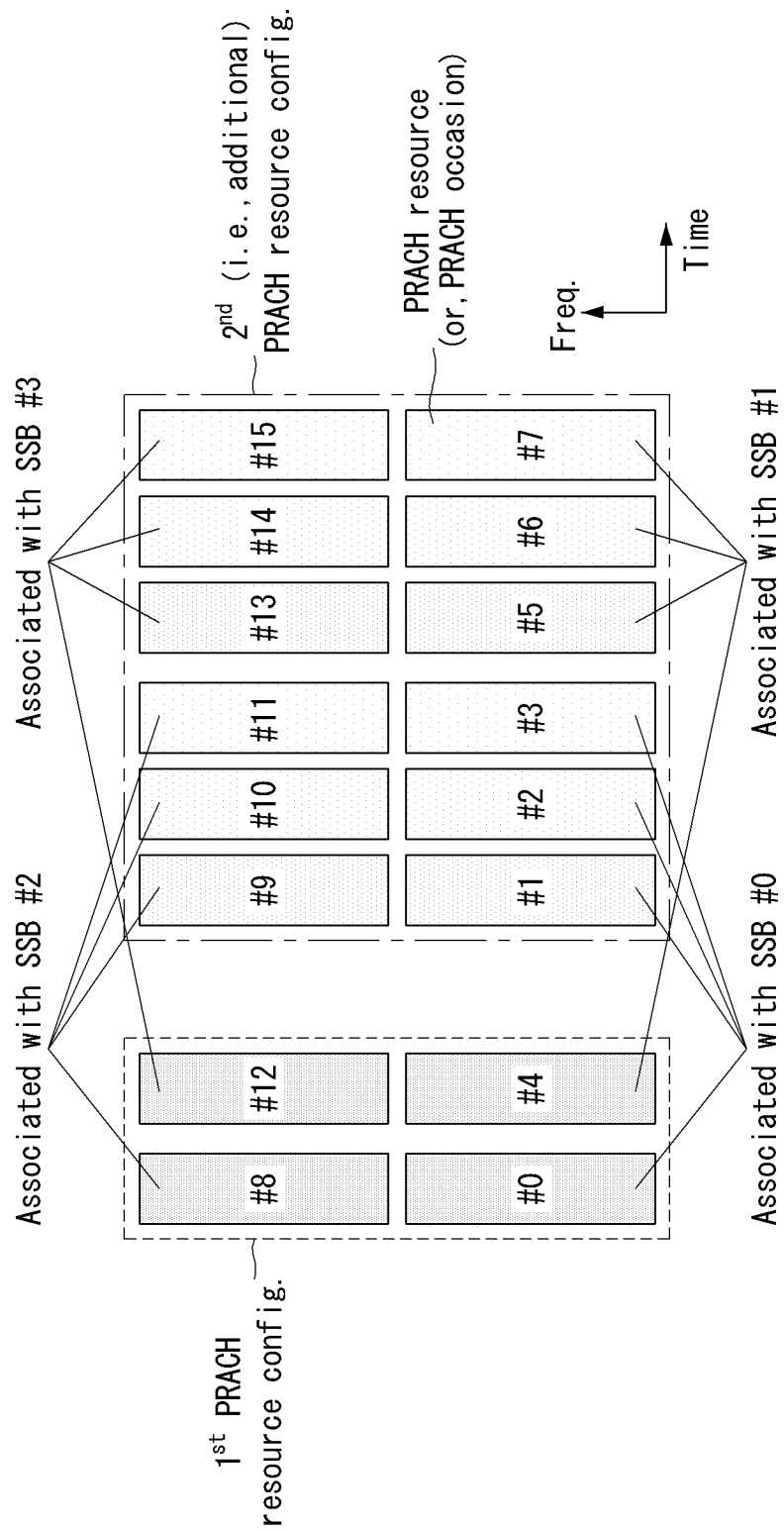
FIG. 10 is a conceptual diagram illustrating a second exemplary embodiment of a method for signaling information on PRACH resource configuration.

FIG. 9 is a conceptual diagram illustrating a first exemplary embodiment of a method for signaling information on PRACH resource configuration, and FIG. 10 is a conceptual diagram illustrating a second exemplary embodiment of a method for signaling information on PRACH resource configuration.

Referring to FIGS. 9 and 10, the terminal may receive configuration information on the first PRACH resource set from the base station. In addition thereto, the terminal may receive configuration information on the second PRACH resource set from the base station. The first PRACH resource set may include four PRACH resources, and the second PRACH resource set may include twelve PRCH resources distinct from the four PRACH resources in the first PRACH resource set. Based on the configuration information on the first PRACH resource set and the configuration information on the second PRACH resource set, the terminal may determine positions of the PRACH resources #0 to #15 (or PRACH occasions #0 to #15) and the association relationship between the PRACH resources and SSB resources. The terminal may be a terminal that performs repeated PRACH transmissions. According to an exemplary embodiment, the configuration information on the first PRACH resource set may be transmitted to another terminal (e.g., a terminal that does not perform repeated PRACH transmissions), and the another terminal may perform a PRACH transmission operation by using the four PRACH resources.

Referring to FIG. 9, the four PRACH resources included in the first PRACH resource set and the twelve PRACH resources included in the second PRACH resource set may be arranged as being interlaced in the time domain. In this case, the terminal (i.e., a terminal performing repeated PRACH transmission operations) may assign indexes or assign association relationship with the SSB resources to the PRACH resources based on time-frequency resource positions of the PRACH resources (i.e., 16 PRACH resources), regardless of the resource set to which the PRACH resources belong. For example, as shown in FIG. 9, the terminal may first assign indexes to PRACH occasions mapped to the same frequency region in ascending order according to an order of time resources, and then may assign indexes to PRACH occasions in descending order according to an order of frequency regions to which the PRACH occasions are mapped. Based on the indexing and the number of repeated PRACH transmissions (e.g., N=4 and/or M=4), the terminal may sequentially map the SSB resources and the PRACH resources in ascending order of the indexes as shown in FIG. 9, so that each SSB resource is mapped to four PRACH occasions.

Referring to FIG. 10, the four PRACH resources included in the first PRACH resource set and the twelve PRACH resources included in the second PRACH resource set may be arranged as not being interlaced in the time domain. That is, each of the four PRACH resources may be disposed in a period preceding (or preceding or equal to) the twelve PRACH resources. In this case, the terminal may assign indexes to the PRACH resources belonging to the first PRACH resource set and the PRACH resources belonging to the second PRACH resource set in an interlace scheme. When the number of repeated PRACH transmissions is 4 (e.g., N=4 and/or M=4), as shown in FIG. 10, the first PRACH occasion belonging to the first PRACH resource set and the first three (i.e., (N−1)) PRACH occasions belonging to the second PRACH set may be numbered as PRACH occasions #0 to #3, respectively. Then, the second PRACH occasion belonging to the first PRACH resource set and the next three (i.e., (N−1)) PRACH occasions belonging to the second PRACH resource set may be numbered as PRACH occasions #4 to #7, respectively. The terminal may assign numbers to sixteen PRACH occasions included in the first PRACH resource set and the second PRACH resource set by repeatedly applying the above rule. Indexing within each resource set may be performed based on a position order of time and frequency resources. Based on the indexing and the number of repeated PRACH transmissions (e.g., N=4 and/or M=4), the terminal may sequentially map the SSB resources and the PRACH resources in ascending order of the indexes as shown in FIG. 10, so that each SSB resource is mapped to four PRACH occasions.

According to the above-described method, a beam (or QCL, spatial QCL) to be used for downlink signal transmission after PRACH transmission of the terminal may be determined based on the association relationship between SSBs and PRACHs. However, according to the above-described method, since a plurality of different PRACH resources should be mapped to each SSB, resource utilization may decrease as the plurality of PRACH resources occupy physical resources.

As a method for solving the above-described problem, a method of spatially reusing random access uplink resources (e.g., PRACH resources) may be considered. A proposed method will be described with reference to the following examples.

Figure 11:
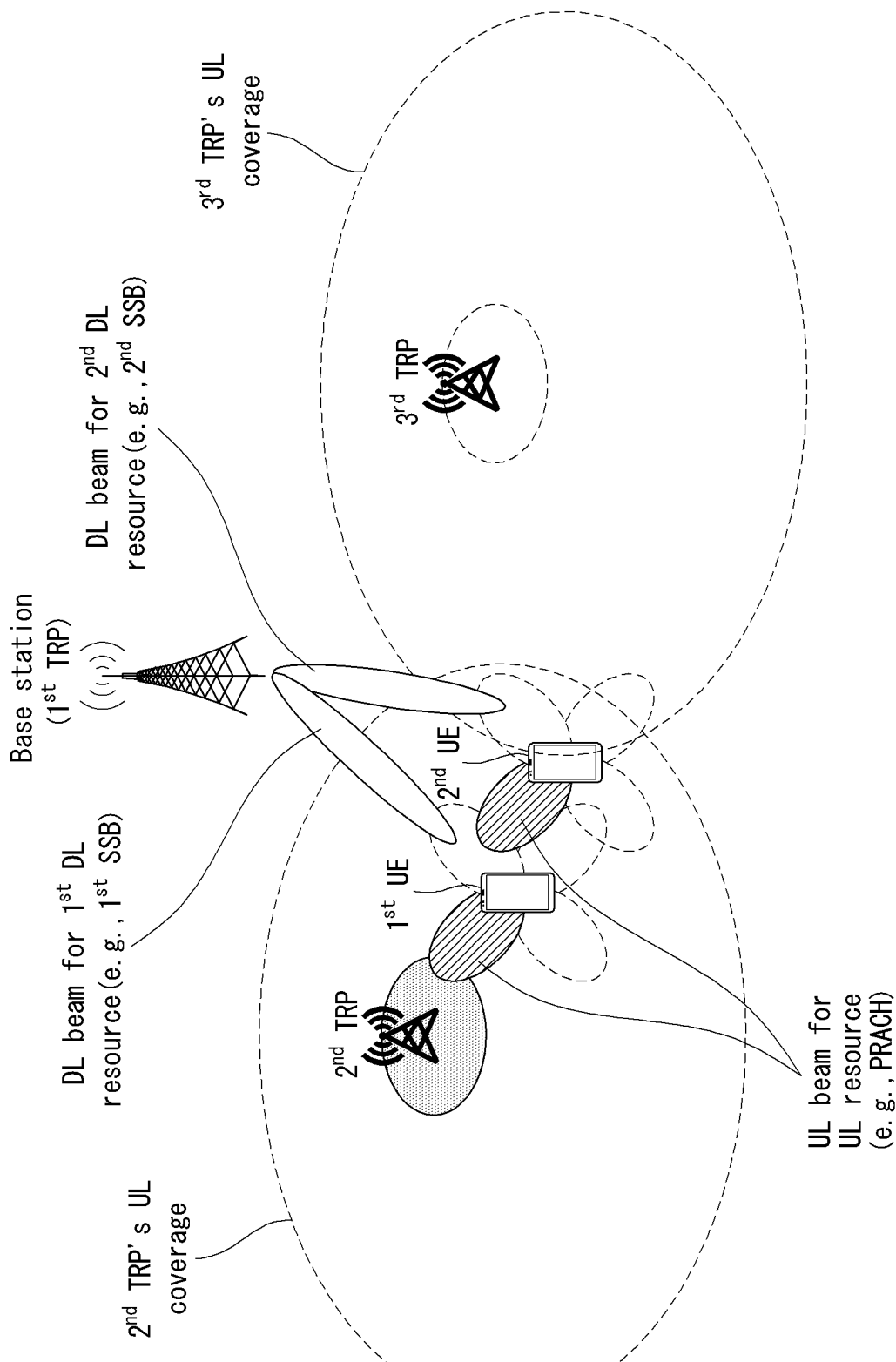
FIG. 11 is a conceptual diagram illustrating a second exemplary embodiment of an initial access method based on uplink beam sweeping.
Figure 12:
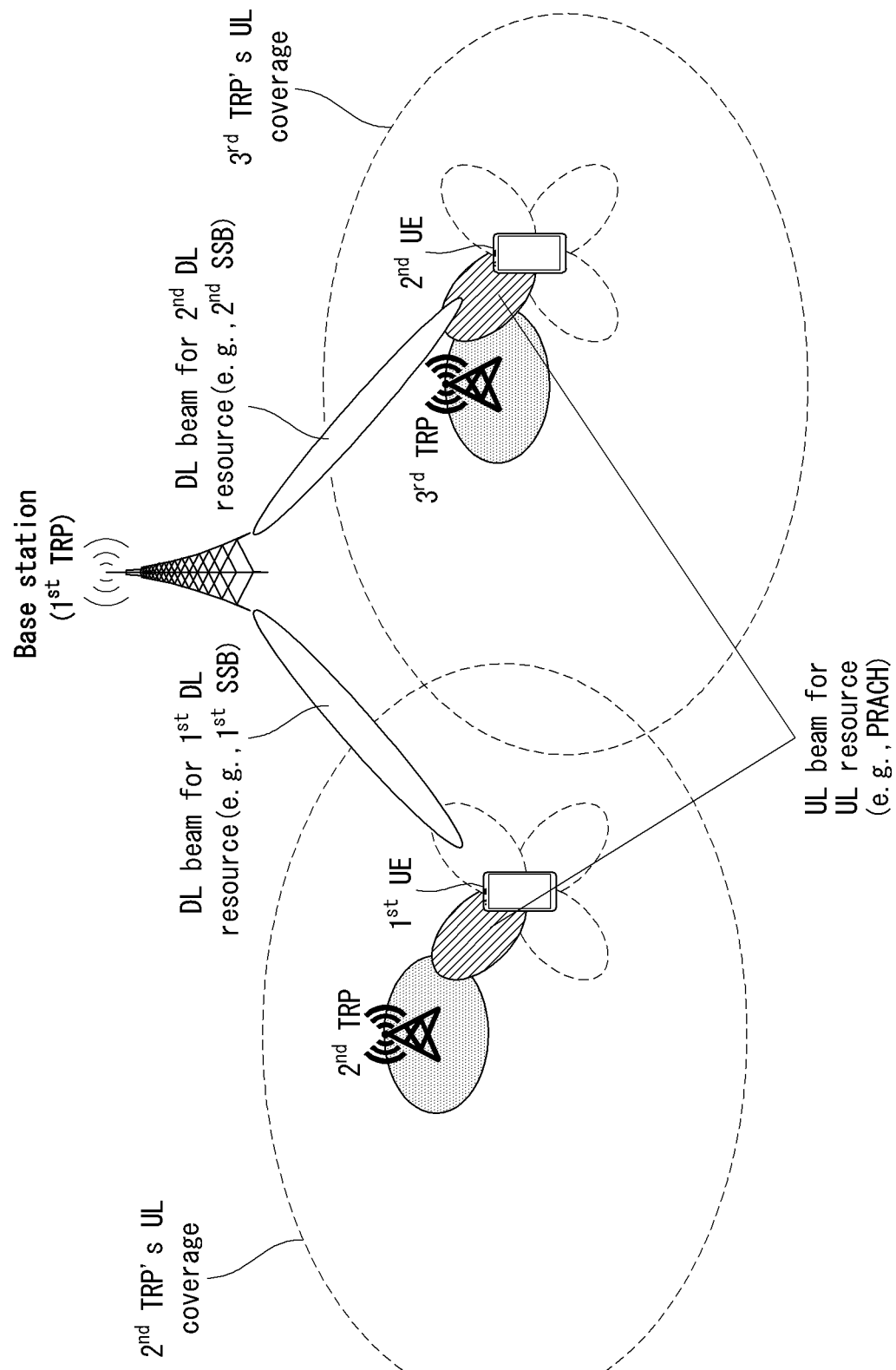
FIG. 12 is a conceptual diagram illustrating a third exemplary embodiment of an initial access method based on uplink beam sweeping.

FIG. 11 is a conceptual diagram illustrating a second exemplary embodiment of an initial access method based on uplink beam sweeping, and FIG. 12 is a conceptual diagram illustrating a third exemplary embodiment of an initial access method based on uplink beam sweeping.

Referring to FIGS. 11 and 12, the base station may include a plurality of TRPs, that is, first, second, and third TRPs. Among them, some TRPs, that is, the second and third TRPs (or RPs) may perform only uplink reception operations. A downlink coverage may be formed by the first TRP, and an uplink coverage may be formed by the first, second, and third TRPs. Accordingly, the uplink coverage and the downlink coverage may be different, and a beam correspondence between a transmission beam and a reception beam may not be established as described above.

A first terminal may receive a first downlink signal (e.g., first SSB) and may transmit an uplink signal (e.g., PRACH) to perform a random access procedure. In addition, a second terminal may receive a second downlink signal (e.g., second SSB) and may transmit an uplink signal (e.g., PRACH) to perform a random access procedure. The first terminal and the second terminal may transmit the PRACHs in the same PRACH resource(s) (e.g., PRACH resource(s) including a first PRACH resource). In this case, in a proposed method, the PRACH resource(s) may be associated with a plurality of downlink signals (e.g., the first SSB and the second SSB).

Referring to FIG. 11, the PRACHs transmitted by the first terminal and the second terminal may be received by the same TRP (e.g., the second TRP) in the same resource (e.g., the first PRACH resource). In this case, when the base station receives the PRACH in the first PRACH resource, it may be difficult for the base station to identify which downlink signal (e.g., SSB) among the first downlink signal (e.g., first SSB) and the second downlink signal (e.g., second SSB) associated with the PRACH the terminal transmitting the PRACH has received. Accordingly, it may be difficult for the base station to determine a transmission beam (e.g., transmission beam of the base station and/or reception beam of the terminal) of a downlink signal (e.g., Msg2, MsgB, Msg4, PDCCH, PDSCH, CSI-RS, etc.) for the terminal after the PRACH transmission, and the base station may fail to transmit the downlink signal.

On the other hand, referring to FIG. 12, the PRACHs transmitted by the first terminal and the second terminal may be received by different TRPs (e.g., the second TRP and the third TRP). In this case, even when the PRACH of the first terminal and the PRACH of the second terminal are received in the same resource (e.g., the first PRACH resource), the PRACH of the first terminal and the PRACH of the second terminal may be distinguished by the TRP through which the PRACH is received. That is, when the base station receives the PRACH through the second TRP, it may be determined that the terminal (i.e., the first terminal) transmitting the PRACH has received or determined the first downlink signal (e.g., the first SSB). In addition, when the base station receives the PRACH through the third TRP, it may be determined that the terminal (i.e., the second terminal) transmitting the PRACH has received or determined the second downlink signal (e.g., the second SSB). Accordingly, the base station may appropriately determine the transmission beam (e.g., transmission beam of the base station and/or reception beam of the terminal) of the downlink signal (e.g., Msg2, MsgB, Msg4, PDCCH, PDSCH, CSI-RS, etc.) for the terminal after the PRACH transmission, and the downlink signal may be transmitted normally.

According to the third exemplary embodiment of FIG. 12, the PRACH resource may be spatially reused. For example, the first terminal belonging to the coverage of the second TRP and the second terminal belonging to the coverage of the third TRP may receive different SSBs, and determine different SSBs as optimal SSBs or determine optimal beams corresponding thereto. However, they may transmit PRACHs and perform random access procedure by using the same PRACH resource(s). Even if the PRACH resources through which the PRACHs are received are the same, the first terminal and the second terminal may be distinguished by the TRPs through which the PRACHs are received, and a downlink beam for the terminal may be determined. To this end, the same PRACH resource(s) may be associated with a plurality of SSBs. In addition, the terminal may be configured with an association relationship between SSBs and PRACHs as described above.

Figure 13:
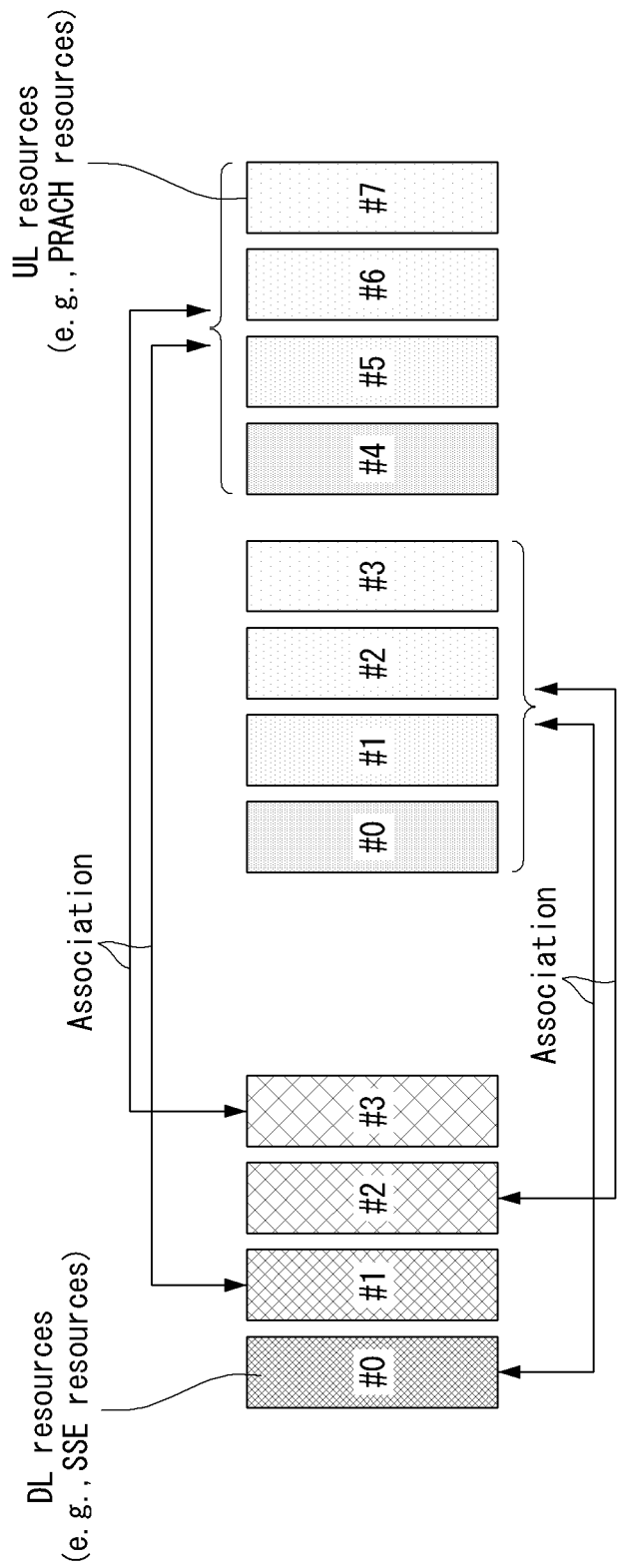
FIG. 13 is a conceptual diagram illustrating a second exemplary embodiment of a method for association between downlink resource(s) and uplink resource(s).

FIG. 13 is a conceptual diagram illustrating a second exemplary embodiment of a method for association between downlink resource(s) and uplink resource(s).

Referring to FIG. 13, SSB resources and PRACH resources may be associated with each other, and a plurality of SSBs may be associated with the same PRACH resource set. That is, PRACH resource sets associated with SSBs may be completely identical to each other or may be disjoint sets having no common elements (i.e., an intersection thereof is an empty set). Here, that the first PRACH resource set and the second PRACH resource set coincide with each other means that PRACH resources included in the first PRACH resource set and PRACH resources included in the second PRACH resource set are configured with the same time-frequency resources and the same PRACH preambles, respectively. In addition, that the first PRACH resource set and the second PRACH resource set are disjoint sets means that PRACH resources included in the first PRACH resource set and PRACH resources included in the second PRACH resource set are mapped to different time-frequency resources or configured with different PRACH preambles, respectively. For example, a PRACH resource set composed of PRACH resources #0 to #3 may be associated with SSB resources #0 and #2. When the terminal determines the SSB resource #0 as an optimal SSB and when the terminal determines the SSB resource #2 as an optimal SSB, the terminal may transmit the PRACH in at least a portion of the PRACH resources #0 to #3. The base station may receive the PRACH in at least the portion of PRACH resources #0 to #3, and based on a TRP that has received the PRACH, the base station may identify which SSB among the SSBs #0 and #2 the terminal transmitting the PRACH has determined as the optimal SSB.

Figure 14:
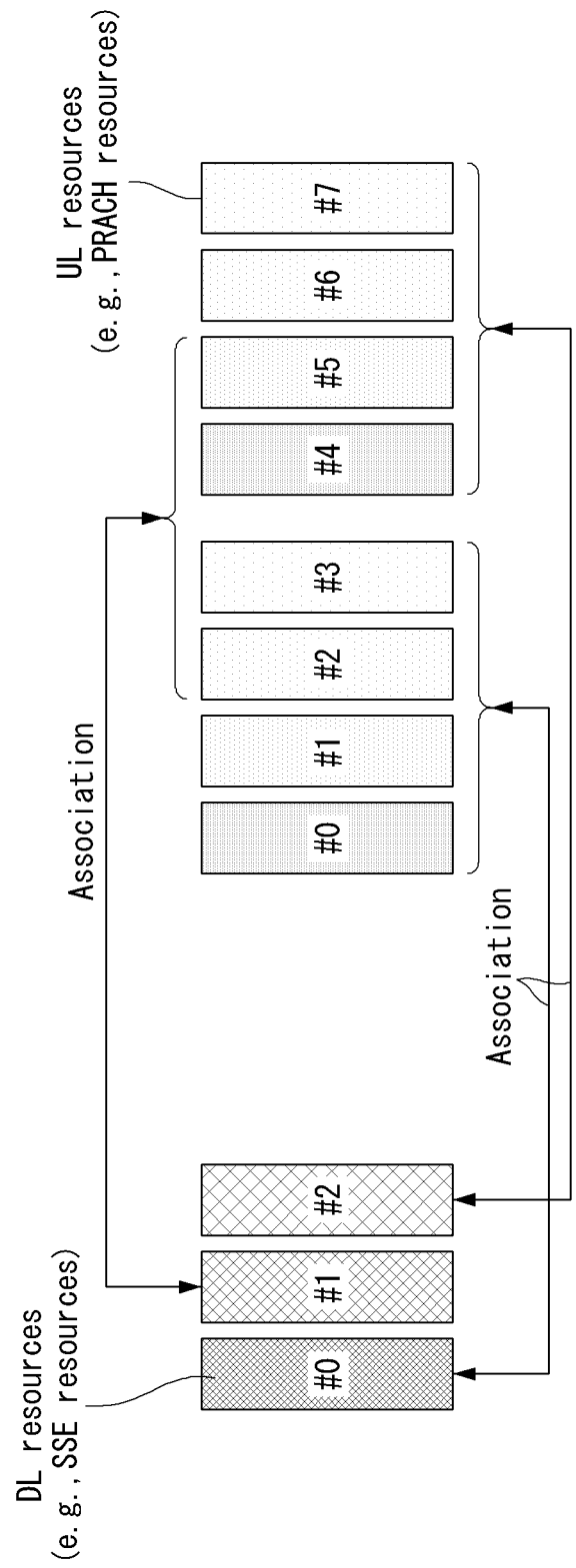
FIG. 14 is a conceptual diagram illustrating a third exemplary embodiment of a method for association between downlink resource(s) and uplink resource(s).

FIG. 14 is a conceptual diagram illustrating a third exemplary embodiment of a method for association between downlink resource(s) and uplink resource(s).

Referring to FIG. 14, SSB resources and PRACH resources may be associated with each other, and a plurality of SSBs may be associated with the same PRACH resource. In this case, PRACH resource sets associated with SSBs may have some PRACH resource(s) as an intersection. For example, an SSB #0 may be associated with a first PRACH resource set composed of PRACH resources #0 to #3, and an SSB #1 may be associated with a second PRACH resource set composed of PRACH resources #2 to #5. The first PRACH resource set and the second PRACH resource set may have some PRACH resources, i.e., PRACH resources #2 and #3, as an intersection.

As described above, when overlapping association between SSB resources and PRACH resources is allowed, the number of cases of associations may increase, and thus a signaling overhead for configuring the association relationship to the terminal may increase. Therefore, there is a need for an effective signaling method capable of minimizing the signaling overhead. A proposed method for this will be described through examples below.

Figure 15:
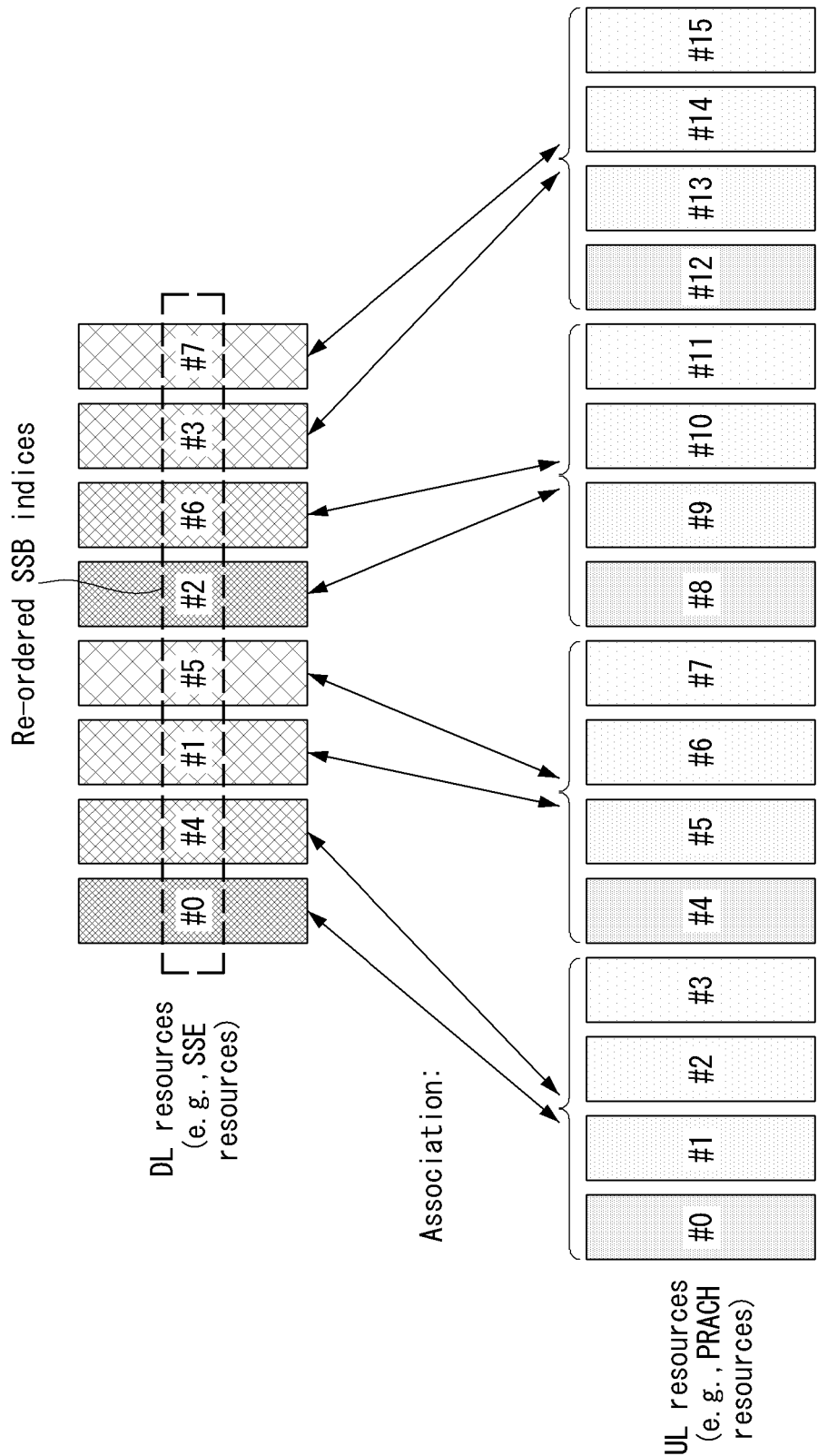
FIG. 15 is a conceptual diagram illustrating a fourth exemplary embodiment of a method for association between downlink resource(s) and uplink resource(s).

FIG. 15 is a conceptual diagram illustrating a fourth exemplary embodiment of a method for association between downlink resource(s) and uplink resource(s).

Referring to FIG. 15, SSB resources and PRACH resources may be associated with each other. In this case, an association relationship between the SSB resources and the PRACH resources may be determined based on SSB resource indexes (i.e., SSB indexes) and PRACH resource indexes (i.e., PRACH occasion indexes). According to a proposed method, the base station may determine a sequence of SSB resource indexes. That is, the SSB resource indexes may be re-ordered in an order other than ascending or descending order. For example, the SSB resource indexes may be listed in an order of #0, #4, #1, #5, #2, #6, #3, and #7.

The SSB resources whose indexes are re-ordered may be sequentially mapped to PRACH resources whose indexes are arranged in an ascending order (or descending order). In this case, the number of PRACH resources mapped to each SSB resource may be referred to as M, and the number of SSBs mapped to each PRACH resource set (i.e., the same PRACH resource set) may be referred to as N (M, N is a natural number). When N=1, the PRACH resources and the SSB resources may be associated without overlapping. When N>1, the PRACH resources may be redundantly associated with a plurality of SSB resources by the above-described method. According to the present exemplary embodiment, M=4 and N=2. In consideration of M and N described above, the SSB resources #0, #4, #1, #5, #2, #6, #3, and #7 may be sequentially mapped to the PRACH resources #0 to #15. For example, the SSB resources #0 and #4, which are the first (N=2) SSB resources, may be equally mapped to the PRACH resources #0 to #3, which are the first (M=4) PRACH resources, and the next (N=2) SSB resources, the SSB resources #1 and #5, may be equally mapped to the PRACH resources #4 to #7, which are the next (M=4) PRACH resources. The next (N=2) SSB resources, the SSB resources #2 and #6, may be equally mapped to the next (M=4) PRACH resources #8 to #11, and the next (N=2) SSB resources, the SSB resources #3 and #7, may be equally mapped to the next (M=4) PRACH resources #12 to #15.

In the above-described method, the sequence of the SSB resource indexes may be determined by the base station, and configuration information of the sequence of the SSB resource indexes may be transmitted from the base station to the terminal. In addition, the configuration information of the SSB resources (e.g., the number of the SSB resources, SSB resource mapping, etc.) and the configuration information of the PRACH resources (e.g., the number of PRACH resources or PRACH occasions, configuration of the PRACH resources or PRACH occasions, PRACH resource mapping, etc.) may be transmitted from the base station to the terminal. The terminal may receive the configuration information through a signaling procedure (e.g., RRC signaling procedure, SIB transmission procedure, DCI, MAC CE, etc.) from the base station. The terminal may determine the association relationship between the SSB resources and the PRACH resources according to the above-described method or a corresponding rule (e.g., a predefined rule) based on the order of the SSB resource indexes, and based thereon, the terminal may perform the above-described random access operation and signal transmission/reception operations thereafter. The information on the sequence of the SSB resource indexes may be expressed by a small number of bit(s), and the signaling overhead may be reduced by the method.

According to another exemplary embodiment, the PRACH resource indexes may be re-ordered, and SSB resources whose indexes are re-ordered in an ascending order (or a descending order) may be sequentially mapped to the PRACH resources whose indexes are re-ordered. Similarly, a sequence of the PRACH resource indexes may be determined by the base station, and information thereof may be transmitted from the base station to the terminal. The terminal may determine the association relationship between the SSB resources and the PRACH resources based on the order of the PRACH resource indexes, and based thereof, the terminal may perform the above-described random access operation and signal transmission/reception operations thereafter.

The PRACH resource (or PRACH occasion) may include a time resource (e.g., symbol(s) or slot(s)) and a frequency resource (e.g., RB(s) or subcarrier(s)). In addition, the PRACH resource (or PRACH occasion) may correspond to one or more PRACH preamble(s) (or sequence(s)). One PRACH resource may be arranged in one slot or in a plurality of consecutive slots. When a plurality of PRACH resources are configured to the terminal, the plurality of PRACH resources may have the same resource configuration. That is, the PRACH resources may have the same duration and the same bandwidth. The PRACH resources may be multiplexed in the frequency domain, multiplexed in the time domain, or multiplexed in the frequency domain and the time domain. The PRACH resources may be consecutive or non-consecutive in the time domain. In addition, the PRACH resources may appear periodically and repeatedly. In this case, the plurality of PRACH resources may follow the same periodicity and period value, and the plurality of PRACH resources may appear repeatedly in each period. The above-described repeated PRACH transmission operation may be performed within one PRACH resource period. That is, the N (or M) PRACH resources for repeated PRACH transmission may be included in the same PRACH resource period. Alternatively, the above-described repeated PRACH transmission operation may be performed over a plurality of PRACH resource periods. That is, the N (or M) PRACH resources for repeated PRACH transmission may be mapped over a plurality of PRACH resource periods.

The configuration information may be transmitted to the terminal through a higher layer signaling procedure (e.g., RRC signaling procedure, MAC CE signaling procedure). For example, the configuration information may be transmitted to the terminal(s) by being included in system information (e.g., SIB, SIB-1, MIB), and the terminal may receive the system information before performing a random access operation (e.g., PRACH transmission operation). Alternatively, the configuration information may be transmitted to the terminal through a physical layer signaling procedure (e.g., DCI) or may be transmitted to the terminal through a combination of the signaling procedures.

A transmission power of the PRACH may be increased in steps. The terminal may expect to receive a random access response from the base station after transmitting the PRACH. For example, the terminal may monitor a random access response message within an RAR window period determined according to a transmission timing of the PRACH. If the terminal does not receive the random access response, the terminal may increase the transmission power of the PRACH and retransmit the PRACH. The above-described operation may be referred to as power ramping. The terminal may increase a power ramping counter for each step of transmitting the PRACH. The transmission power of the PRACH may be a function of the power ramping counter. The above-described operation may be repeatedly performed until the terminal receives the RAR or until the power ramping counter reaches an upper limit value.

In the case of the network configuration shown in FIG. 3, or when (Method 100) is used, the transmission power of the PRACH may be a function of an uplink pathloss or an estimate thereof. For example, the transmission power $P_{PRACH,b,f,c}(i)$ of the PRACH for a transmission occasion i, a carrier f, a serving cell c, and an uplink bandwidth part b may be expressed as Equation 1 below.

$$P_{PRACH,b,f,c}(i) = \min\{P_{CMAX,f,c}(i), P_{PRACH,target,f,c} + PL_{b,f,c}\} \text{ [dBm]} \quad \text{[Equation 1]}$$

Here, $P_{CMAX,f,c}(i)$ may be the maximum output power of the terminal, $P_{PRACH,target,f,c}$ may be a reception target power, and $PL_{b,f,c}$ may be a path loss. The reception target power $P_{PRACH,target,f,c}$ may be determined based on a reception target power value set by the base station, a power increment by the power ramping counter, a power offset (or correction value) according to a preamble format, a power offset (or correction value) for two-step random access, and/or the like. The terminal may measure a reception strength (e.g., RSRP) of a downlink signal and may estimate the uplink path loss based thereon. This may be based on a premise that the uplink path loss is similar to the downlink path loss. The downlink signal used for path loss estimation may be a signal associated with the PRACH (e.g., SSB or CSI-RS associated with the PRACH).

On the other hand, in the case of the asymmetric UL/DL network as shown in FIGS. 5A and 5B, or when (Method 110) is used, the node receiving the PRACH and the node transmitting the initial access signal (e.g., SSB or CSI-RS associated with the PRACH) may be different from each other. Therefore, it may be difficult to estimate the uplink path loss through the above-described method. In this case, the transmission power of the PRACH may be determined regardless of the uplink path loss or its estimated value. For example, the transmission power $P_{PRACH,b,f,c}(i)$ of the PRACH for the transmission occasion i, carrier f, serving cell c, and uplink bandwidth part b may be expressed as Equation 2 or Equation 3 below.

$$P_{PRACH,b,f,c}(i) = \text{Min}\{P_{CMAX,f,c}(i), P_{PRACH,target,f,c}\} \quad \text{[Equation 2]}$$

$$P_{PRACH,b,f,c}(i) = \text{Min}\{P_{CMAX,f,c}(i), P_{PRACH,target,f,c} + A\} \quad \text{[Equation 3]}$$

Here, the value of A may be predefined in the technical specification or set by the base station to the terminal. The value of A may be determined as a value corresponding to the uplink path loss. In an exemplary embodiment, A may be 0. In this case, $P_{PRACH,target,f,c}$ may be determined as a value corrected in consideration of the uplink path loss.

Alternatively, the transmission power of the PRACH may be determined by Equation 4 below.

$$P_{PRACH,b,f,c}(i) = \text{Min}\{P_{CMAX,f,c}(i), P_{PRACH,target,f,c} + k \times PL_{b,f,c}\} \quad \text{[Equation 4]}$$

Here, the value of k may be determined depending on whether the above-described repeated PRACH transmission operation is performed. For example, when the PRACH repeated transmission operation is performed (e.g., (Method 110) is used), k=1, and when the PRACH repeated transmission operation is not performed (e.g., (Method 110)) is not used or (Method 100) is used, k=0. The above-described PRACH power control method may be referred to as (Method 120).

When the PRACH is repeatedly transmitted, the same transmission power may be applied to the repeatedly transmitted PRACHs. For example, the transmission power value determined by the above-described method may be equally applied to the repeatedly transmitted PRACHs. If the terminal does not receive a random access response message within the RAR window after performing the repeated PRACH transmission, it may increase the PRACH transmission power and re-perform the repeated PRACH transmissions. That is, the terminal may transmit a plurality of PRACHs for each power ramping step. In this case, the terminal may execute one power ramping counter, and the one power ramping counter may operate in common for repeatedly transmitted PRACHs. For each power ramping step, the power ramping counter may be incremented by 1. Alternatively, a plurality of power ramping counters may be used for the power ramping operations for repeated PRACH transmissions. For example, the power ramping counter may operate for each repeatedly transmitted PRACH, that is, each PRACH resource (or each PRACH occasion). Alternatively, PRACH resources for repeated transmission (e.g., N PRACH resources, or M PRACH resources) may be distributed to a plurality of PRACH resource groups, and a power ramping counter may be configured and may operate for each PRACH resource group.

As a method different from the above-described method, different transmission powers may be applied to repeatedly transmitted PRACHs. For example, the above-described PRACH power control method may be independently applied to each PRACH resource or PRACH resource group configured to the terminal. In this case, one power ramping counter may be commonly applied to a plurality of PRACH resources. Alternatively, the power ramping counter may also operate independently for each PRACH resource or for each PRACH resource group.

The terminal may check a validity of each of the above-described PRACH resources. When the PRACH resource through which the terminal is to transmit the PRACH satisfies a predetermined condition, the terminal may consider that the PRACH resource is not valid and may not transmit the PRACH in the PRACH resource. The predetermined condition may be predefined in the technical specification. For example, when a certain PRACH resource overlaps with a downlink symbol, when a PRACH resource overlaps with a specific downlink signal (e.g., SSB) in time, and/or when a PRACH resource does not satisfy a timing condition with another signal, the PRACH resource may be considered invalid. As an example of the timing condition, when a distance (e.g., symbol distance) between a time point at which the terminal receives a PDCCH order (or DCI corresponding thereto) (e.g., the last symbol in which the PDCCH order is transmitted) and a PRACH resource to transmit the PRACH (e.g., the first symbols of the PRACH resource) is smaller than a threshold, the PRACH resource may not be valid. The above condition may be applied when the PRACH transmission is triggered by a PDCCH order.

When the terminal performs the above-described repeated PRACH transmission or beam sweeping operation, the terminal may transmit the PRACH in valid resource(s). In addition, the terminal may not transmit the PRACH in invalid resource(s). Accordingly, the number of repeated PRACH transmissions actually performed by the terminal may be determined for each PRACH resource period or for each power ramping step, and the actual number of repeated PRACH transmissions in a certain period or step may be less than a set or predefined number (e.g., N or M) of repeated transmissions. In this case, the PRACH may be transmitted only in some beam directions, and the base station may not receive the PRACH. Therefore, the random access procedure may be delayed.

As a method for solving the above-described problem, a method for transmitting the remaining PRACH(s) that have not been transmitted in the invalid PRACH resource(s) and/or beam(s) corresponding thereto in other PRACH resource(s) (e.g., PRACH resource(s) of the next PRACH resource period) may be considered. In this case, the other PRACH resource(s) (e.g., PRACH resource(s) of the next PRACH resource period) and the invalid PRACH resource(s) may be resources associated with the same SSB resource(s). Alternatively, if some PRACH transmissions are dropped by the above-described method in a certain PRACH resource period, the terminal may not transmit the PRACH in the corresponding period. Instead, the terminal may repeatedly transmit a predetermined or set number (e.g., N or M) of PRACH(s) in the next PRACH resource period. That is, if all PRACH resources in which repeated PRACH transmissions are to be performed are valid, the terminal may perform the repeated PRACH transmissions in the corresponding PRACH period. Otherwise, the PRACH transmission operation may be delayed until a valid PRACH period in which all PRACH resources for the repeated PRACH transmission are valid appears. The terminal may perform the repeated PRACH transmissions in a certain PRACH period (e.g., the earliest PRACH period) in which all PRACH resources for performing the PRACH repeated transmissions are valid among PRACH periods appearing later.

As described above, multiple beams may be applied to the repeated PRACH transmissions. The terminal may determine transmission beams (or, transmission spatial filters, transmission spatial relationship information, etc.) to be applied to the PRACH resources, and may transmit the PRACH by using the transmission beams mapped to the respective resources. In this case, the mapping between the PRACH resource(s) and the transmission beam(s) (or spatial relation information, transmission spatial correlation parameter(s), spatial QCL(s), etc.) may not be changed while performing the same random access procedure. This may be referred to as (Method 200). Alternatively, the mapping between the PRACH resource(s) and the transmission beam(s) (or spatial relation information, transmit spatial correlation parameter(s), spatial QCL(s), etc.) may be allowed to be changed while performing the same random access procedure. This may be referred to as (Method 210).

Figure 16:
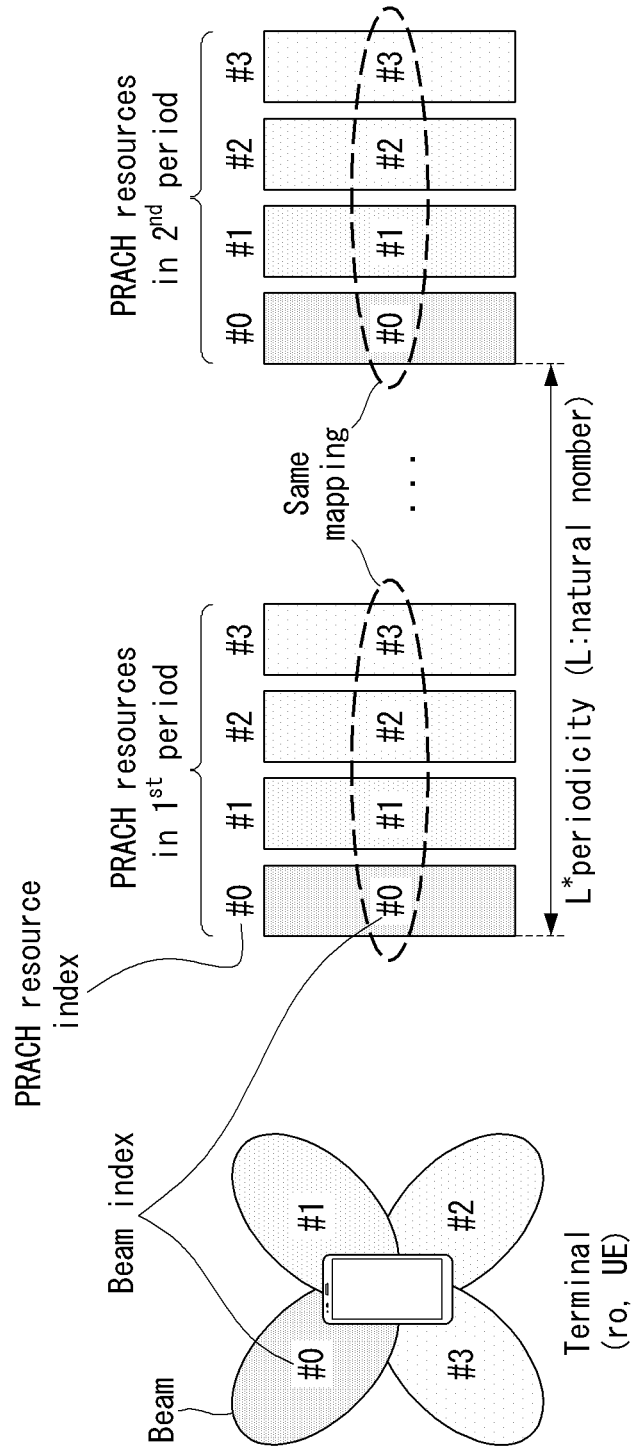
FIG. 16 is a conceptual diagram illustrating a first exemplary embodiment of a mapping method between PRACH resources and transmission beams.

FIG. 16 is a conceptual diagram illustrating a first exemplary embodiment of a mapping method between PRACH resources and transmission beams.

Referring to FIG. 16, PRACH resources configured by the base station to the terminal may include four PRACH resources, that is, PRACH resources #0, #1, #2, and #3. The four PRACH resources may have the same period. The terminal may repeatedly transmit a signal (e.g., PRACH) in the four PRACH resources using four transmission beams by the above-described method. In this case, while performing the same random access procedure by (Method 200), the mapping between the PRACH resources (or PRACH occasions) and the transmission beams (or spatial relation information, transmission spatial correlation parameters, spatial QCLs, etc.) may be maintained. For example, the terminal may transmit the PRACH in a first period and a second period within the same random access procedure. For example, the terminal may initially transmit the PRACH in the first period, and may apply power ramping and retransmit the PRACH in the second period. In this case, transmission beams #0, #1, #2, and #3 may be mapped to the PRACH resources #0, #1, #2, and #3 of the first period, respectively, and the same beam mapping may be applied to the PRACH resources of the second period. The terminal may apply the same transmission beam (or transmission spatial filter, transmission spatial relation information) to the same PRACH resources (e.g., PRACH resources having the same resource index) of different periods or different power ramping steps (for transmitting the PRACH). The above-described operation may be predefined in the technical specification. Alternatively, the terminal may be indicated by the base station to perform the above-described operation.

Figure 17:
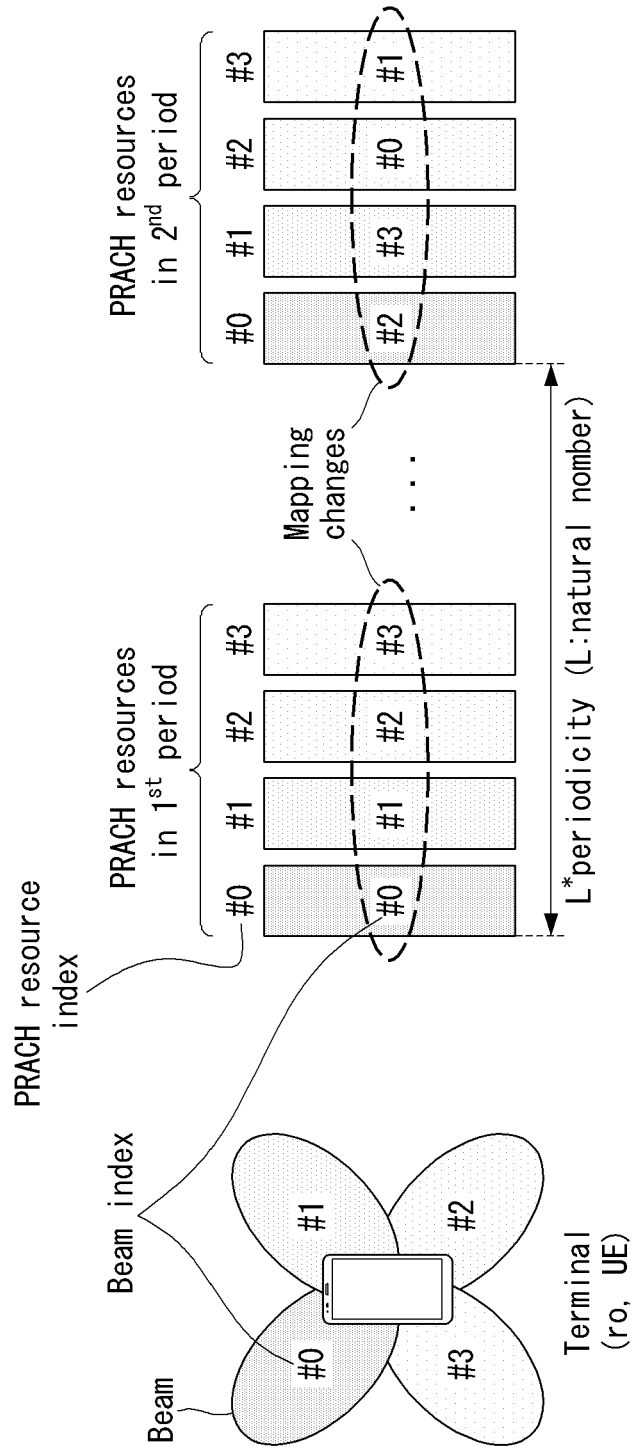
FIG. 17 is a conceptual diagram illustrating a second exemplary embodiment of a mapping method between PRACH resources and transmission beams.

FIG. 17 is a conceptual diagram illustrating a second exemplary embodiment of a mapping method between PRACH resources and transmission beams.

Referring to FIG. 17, the terminal may be configured with PRACH resources in the same manner as in the first exemplary embodiment of FIG. 16. The terminal may repeatedly transmit a signal (e.g., PRACH) using four transmission beams by the above-described method. In this case, the mapping between the PRACH resources and transmission beams (or spatial relation information, transmission spatial correlation parameters, spatial QCLs, etc.) may be changed while the terminal performs the random access procedure by (Method 210). For example, as described above, the terminal may transmit the PRACH in a first period and a second period within the same random access procedure. In this case, transmission beams #0, #1, #2, and #3 may be mapped to PRACH resources #0, #1, #2, and #3 of the first period, respectively, and a beam mapping different therefrom may be applied to PRACH resources of the second period. For example, the transmission beams #2, #3, #0, and #1 may be mapped to PRACH resources #0, #1, #2, and #3 of the second period, respectively. The operation of changing the beam mapping may be performed when a predetermined condition is satisfied. For example, when the terminal determines that at least some of the PRACH resources to be used for the repeated PRACH transmissions are invalid resources, or when the number of valid resource(s) among the PRACH resources to be used for the repeated PRACH transmissions changes from the previous period or the previous step, the terminal may perform the above-described beam mapping change operation. In this case, an operation in which the terminal determines a transmission beam (or, a transmission spatial filter, transmission spatial relation information, etc.) to be applied to each PRACH resource for which the repeated PRACH transmission is performed may not be defined in the technical specification. The transmission beam (or, a transmission spatial filter, transmission spatial relationship information, etc.) applied to a PRACH resource may be arbitrarily determined by the terminal. The terminal may be indicated by the base station to perform the above-described operation.

Figure 18A:
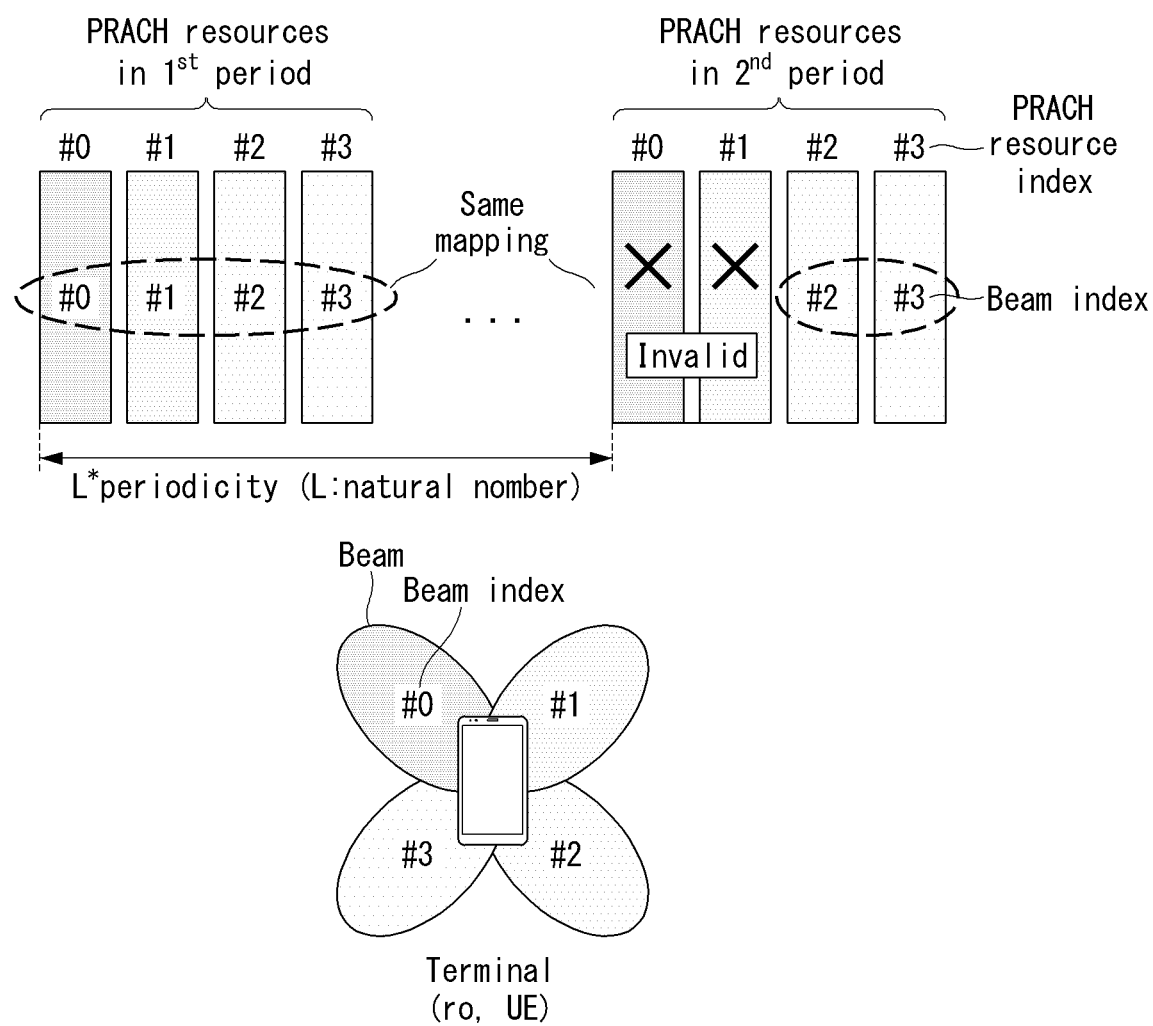
FIG. 18A is a conceptual diagram illustrating a third exemplary embodiment of a mapping method between PRACH resources and transmission beams.
Figure 18B:
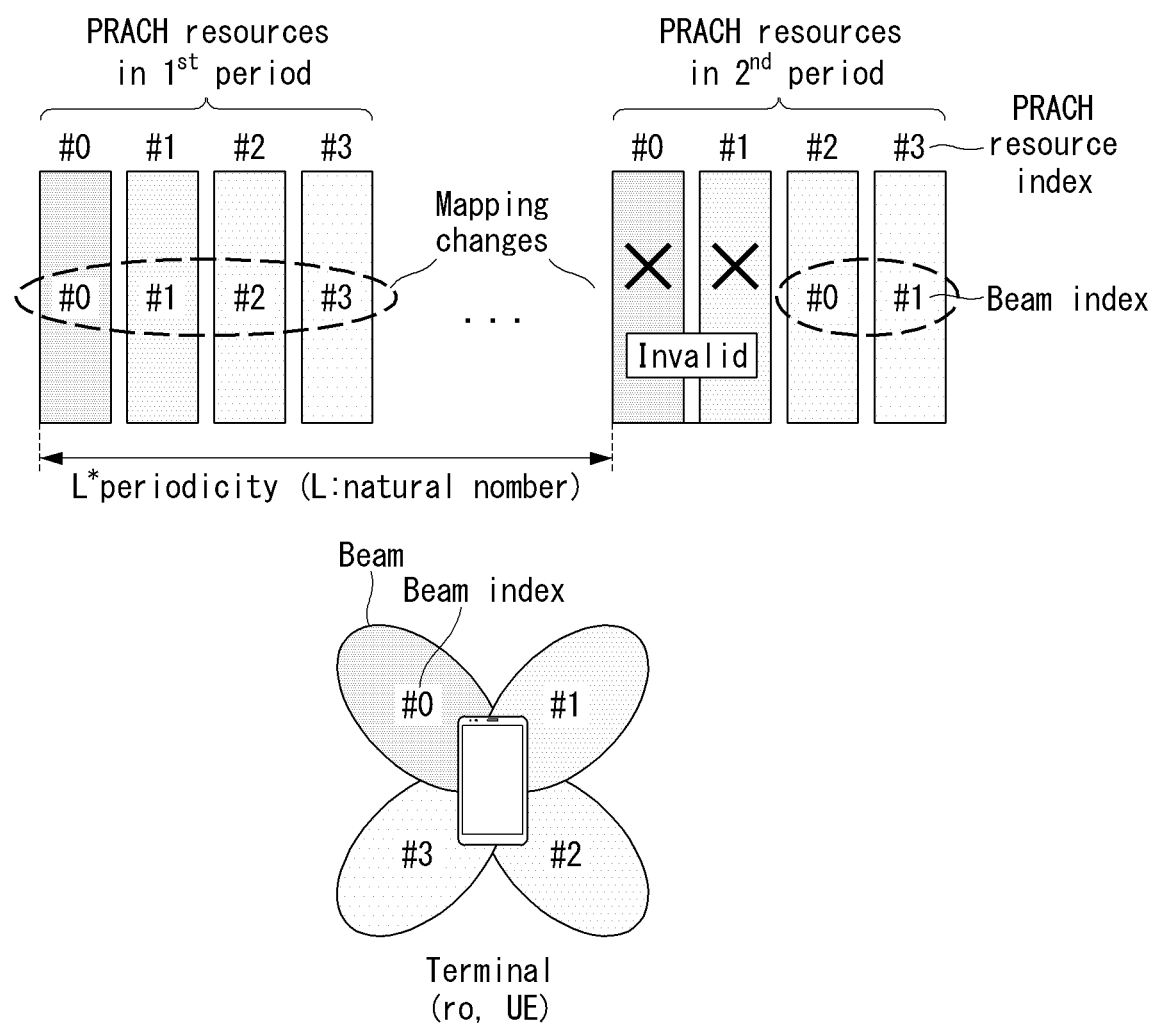
FIG. 18B is a conceptual diagram illustrating a fourth exemplary embodiment of a mapping method between PRACH resources and transmission beams.
Figure 18C:
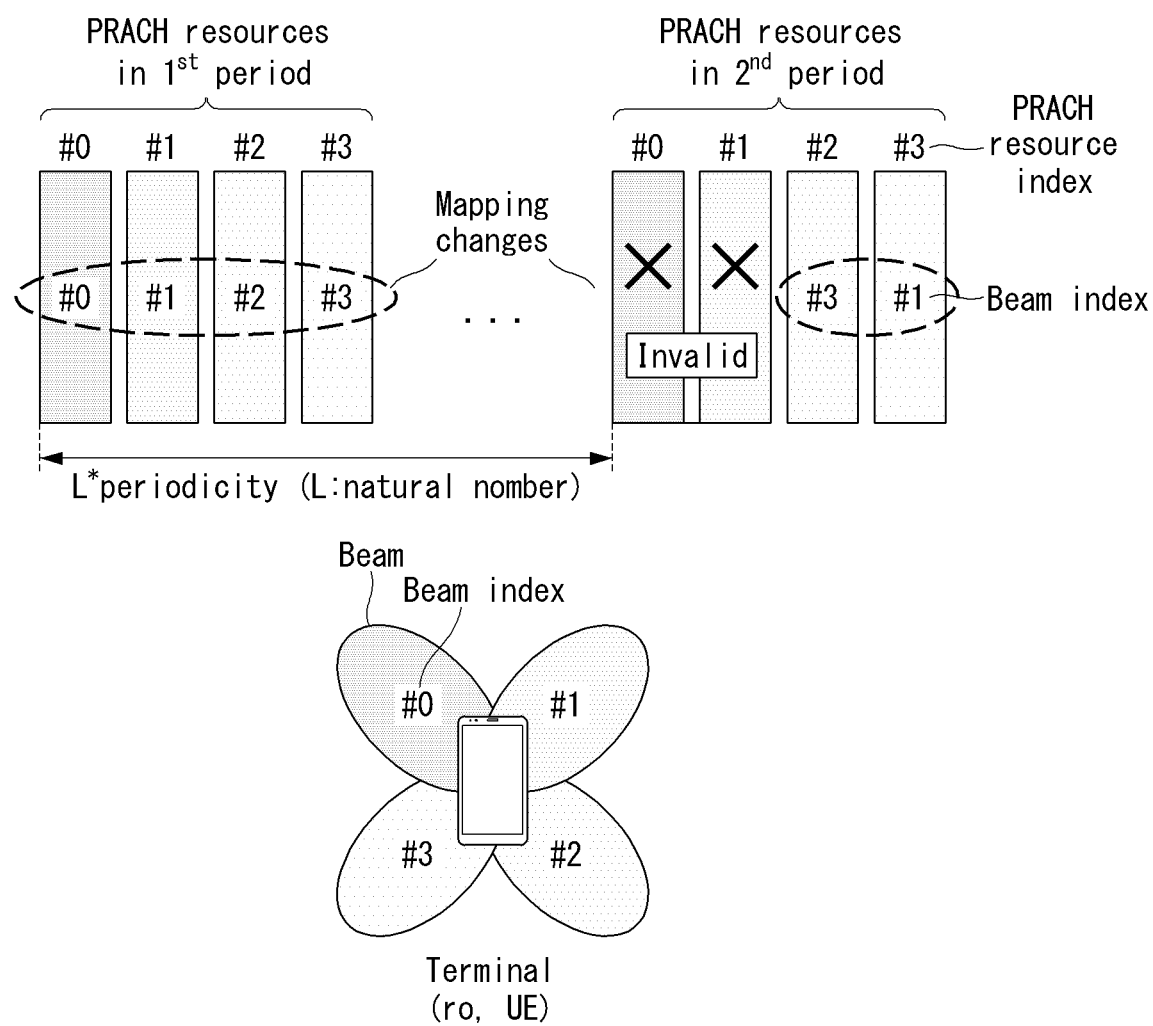
FIG. 18C is a conceptual diagram illustrating a fifth exemplary embodiment of a mapping method between PRACH resources and transmission beams.

FIG. 18A is a conceptual diagram illustrating a third exemplary embodiment of a mapping method between PRACH resources and transmission beams, FIG. 18B is a conceptual diagram illustrating a fourth exemplary embodiment of a mapping method between PRACH resources and transmission beams, and FIG. 18C is a conceptual diagram illustrating a fifth exemplary embodiment of a mapping method between PRACH resources and transmission beams.

Referring to FIGS. 18A to 18C, the terminal may be configured with PRACH resources in the same manner as in the above exemplary embodiments. The terminal may repeatedly transmit a signal (e.g., PRACH) using four transmission beams by the above-described method. In this case, the terminal may determine some PRACH resources as invalid resources. For example, in the second period, PRACH resources #0 and #1 may be determined as invalid resources, and the terminal may not transmit the PRACH in the corresponding resources. The terminal may repeatedly transmit the PRACH in at least some of the remaining valid PRACH resources (e.g., PRACH resources #2 and #3).

In this case, when (Method 200) is used, the mapping between the PRACH resources and the transmission beams may be maintained while performing the random access procedure. Referring to FIG. 18A, transmission beams #2 and #3 may be equally mapped to PRACH resources #2 and #3 in the first period and the second period, respectively. Alternatively, when (Method 210) is used, the mapping between the PRACH resources and the transmission beams may be changed while performing the random access procedure. Referring to FIG. 18B, transmission beams mapped to the PRACH resource #2 in the first period and the second period may be different from each other. In this case, the same mapping may be maintained between the valid PRACH resource(s) and the transmission beam(s). For example, the PRACH resource #0 of the first period and the PRACH resource #2 of the second period are the first valid PRACH resources in the respective periods, and the transmission beam #0, which is the same transmission beam, may be mapped to the first valid PRACH resource in each period. In addition, the PRACH resource #1 of the first period and the PRACH resource #3 of the second period are the second valid PRACH resources in the respective periods, and the transmit beam #1, which is the same transmit beam, may be mapped to the second valid PRACH resource of each period. Referring to FIG. 18C, transmission beams mapped to the PRACH resources #2 in the first period and the second period may be different from each other. The terminal may arbitrarily determine the transmission beams applied to the PRACH resources and transmit the PRACH using the corresponding beams.

In the above exemplary embodiments, the terminal transmits the PRACH in the first period, but may not receive a RAR therefor. In this case, the terminal may retransmit the PRACH in the second period. In this case, power ramping may be applied to the PRACH transmitted in the second period. When one power ramping counter is used, the power ramping counter may be incremented by 1 at each step regardless of the number of PRACHs actually transmitted (or the number of repeated PRACH transmissions) in each transmission or retransmission. On the other hand, when a plurality of power ramping counters are used, for example, when a power ramping counter operates for each PRACH resource (or PRACH resource group), the power ramping counter may be counted (i.e., increased by 1) only when the PRACH is actually transmitted in the corresponding PRACH resource (or PRACH resource group). For example, in the third exemplary embodiment of FIG. 18A, the terminal may not count the power ramping counters for the PRACH resources #0 and #1, and may count the power ramping counters for the PRACH resources #2 and #3 in the second period. Accordingly, the power ramping counters for the respective PRACH resources may have different values, and accordingly, different transmission powers may be applied to the PRACH resources in the respective PRACH transmission/retransmission steps. Accordingly, the transmission power consumption of the terminal for the PRACH transmission may be reduced.

The base station (or a specific TRP constituting the base station) may receive (or monitor) the PRACH from the PRACH resource(s). Referring again to FIG. 6, the base station may receive (or monitor) the PRACH in four PRACH resources. For example, the base station may monitor the PRACH resources #0 and #1 based on a reception beam #0, and may monitor the PRACH resources #2 and #3 based on a reception beam #1. For another example, the base station may monitor all PRACH resources based on a single reception beam (e.g., a reception beam with an omni-directional gain). For another example, the base station may receive (or monitor) the PRACH using four different reception beams in 4 PRACH resources, respectively. When the base station receives the PRACH in the PRACH resource(s), the base station may inform the terminal of the PRACH resource (e.g., PRACH resource index) through which the PRACH is received. If the base station receives the PRACHs in a plurality of PRACH resources, the base station may determine one PRACH resource, and may inform the terminal of the determined PRACH resource (e.g., PRACH resource index). Alternatively, the base station may inform the terminal of the plurality of PRACH resources (e.g., PRACH resource indexes) through which the PRACHs are received. For example, the base station may inform the terminal of two PRACH resources (e.g., two PRACH resource indexes) through which the PRACHs are received. In this case, a beam corresponding to one PRACH resource may be configured as a primary beam, and a beam corresponding to another PRACH resource may be configured as a secondary beam. The primary beam and the secondary beam may be used for transmission of specific physical signal(s) and/or channel(s), respectively. For example, the primary beam may be used for transmission of a PUCCH, SRS, PRACH, MsgA PRACH, MsgA PUSCH, Msg3, PDCCH, CSI-RS, TRS, and/or the like. The secondary beam may be used for transmission of a PUSCH, SRS, PDSCH, CSI-RS, and/or the like. Alternatively, the base station may inform the terminal of beams corresponding to the plurality of PRACH resources without distinguishing between the primary beam and the secondary beam. In this case, only information on indexes of the plurality of PRACH resources or a combination thereof may be transmitted to the terminal, and thus a signaling overhead therefor may be reduced.

Referring again to FIG. 7, the repeated PRACH transmissions may be performed based on the association relationship between the SSB resources and the PRACH resources. For example, the terminal may receive the SSB resource #1 or an SSB corresponding thereto, or determine the SSB as an optimal SSB, and may transmit the PRACH in at least some of PRACH resources #4 to #7 associated with the SSB resource #1. According to the above-described method, the base station may inform the terminal of the PRACH resource (e.g., PRACH resource #5) through which the base station receives the PRACH or its index. In this case, the index may be an indicator (e.g., one of values 0 to 15, that is, 4 bits of information) that can distinguish all PRACH resources (e.g., PRACH resources #0 to #15). Alternatively, when the association relationship between the SSBs and the PRACHs is used as described above, the indexes may an indicator that can distinguish some PRACH resources (e.g., PRACH resources #4 to #7) (e.g., one of values 0 to 3, that is, 2 bits of information). The some PRACH resources may be PRACH resources associated with to the same SSB resource (e.g., SSB resource #1) as the PRACH resource(s) (e.g., PRACH resource #5) through which the base station received the PRACH. The terminal may interpret the index as an index indicating one of the PRACH resources associated with the same SSB resource as the PRACH resource(s) through which the terminal has transmitted the PRACH, and based thereon, the terminal may identify in which PRACH resource the base station received the PRACH. For example, in the above exemplary embodiment, when 1 is received among the values of PRACH resource indexes 0 to 3, the terminal may consider that the index indicates the PRACH resource #5, the second resource among the PRACH resources #4 to #7. According to the latter method, the PRACH resource index may be expressed with a smaller number of bits, and thus a signaling overhead therefor may be reduced.

Information on the PRACH resource determined by the base station (e.g., PRACH resource, PRACH resource index, PRACH beam index corresponding to the PRACH resource, etc.) may be transmitted to the terminal as being included in the Msg2 or MsgB. For example, the information may be included in the RAR and may be transmitted on a PDSCH. Alternatively, the information may be transmitted to the terminal as being included in a PDCCH whose CRC is scrambled by a predetermined RNTI (e.g., RA-RNTI), that is, as a part of a DCI payload. Alternatively, the information on the PRACH resource determined by the base station may be transmitted to the terminal as being included in the Msg4 (e.g., Msg4 PDSCH). The terminal may identify in which PRACH resource(s) the base station has successfully received the PRACH by receiving the Msg2, MsgB, or Msg4. Additionally or alternatively, the information on the PRACH resource determined by the base station may be transmitted on a downlink signal or channel transmitted after the terminal receives the Msg4. In addition, the terminal may obtain information on the PRACH resource determined by the base station by an implicit method. For example, the terminal may obtain information on the PRACH resource determined by the base station based on a position of a resource where the base station transmits a specific signal (e.g., PDCCH and/or PDSCH). The terminal may assume that a signal including the information on the PRACH resource has a QCL relationship (e.g., spatial QCL relationship) with an SSB associated with the PRACH resource(s) in which the terminal transmitted the PRACH, and receive the signal under the QCL assumption. For example, the terminal may monitor PDCCH candidate(s) under assumption that the PDCCH candidate(s) have a QCL relationship with the SSB in a Type 1 PDCCH CSS set, and receive a DCI scheduling a Msg2/MsgB PDSCH and/or the Msg2/MsgB PDSCH.

The terminal may use a transmission beam (or a transmission spatial filter, transmission spatial relationship information) used for transmitting the PRACH in the PRACH resource indicated by the base station as a reference beam for uplink transmission (or a reference transmission spatial filter, reference spatial relationship information). The terminal may perform uplink transmission other than the PRACH or uplink transmission after the PRACH by applying the reference beam. For example, the terminal may determine a transmission beam of a PUSCH, PUCCH, SRS, etc. based on the transmission beam of the PRACH resource selected by the base station. In addition, the terminal may determine a transmission beam of a Msg3 PUSCH, MsgA PUSCH, Msg4 PDSCH, etc., based on the transmission beam of the PRACH resource selected by the base station, and based on the determined transmission beam, the terminal may perform transmission of the Msg3 PUSCH, MsgA PUSCH, Msg4 PDSCH, etc. In addition, the terminal may repeatedly transmit the Msg3 PUSCH, the MsgA PUSCH, etc. in a plurality of PUSCH resources based on configuration information received from the base station. In this case, the same transmission beam (e.g., the same beam as the transmission beam applied to the PRACH resource indicated by the base station) may be applied to the plurality of resources. In order to continuously manage the reference beam, the above-described operation, that is, the operation in which the terminal repeatedly transmits the PRACH and the base station notifies the terminal of the PRACH resource (e.g., PRACH resource index) through which the PRACH is received may be repeatedly or periodically performed. The above-described operation may be performed based on an uplink signal or uplink resource other than the PRACH. For example, in the above operation, the PRACH may be replaced with an SRS, and the PRACH resources may be replaced with SRS resources. SRS resource configuration for repeated SRS transmissions may be performed based on the above-described PRACH resource configuration method. The reference beam management operation by the SRS may be applied to the terminal in the RRC connected mode. Alternatively, the terminal may receive configuration information of SRS resources from the base station in the RRC idle mode through higher layer signaling (e.g., cell-specific RRC signaling, SIB, MIB, etc.), and may perform repeated SRS transmissions by using a plurality of transmission beams in the SRS resource(s) in the RRC idle mode.

In the above-described method, the terminal may arbitrarily change or determine the beam of the PRACH. In this case, the reference beam may be determined as a beam used in a random access procedure most recently performed by the terminal, a beam applied to the most recently transmitted PRACH by the terminal, a beam corresponding to a PRACH resource indicated by the base station according to the above-described method for a PRACH transmission (e.g., repeated PRACH transmission) most recently performed by the terminal, or the like.

The above-described method may be used limitedly to a case where the asymmetric UL/DL network and the repeated PRACH transmission method (e.g., (Method 110)) are applied. In this case, whether the information on the PRACH resource is included in the RAR (or the total payload size of the RAR message) may be determined by whether repeated PRACH transmission is performed (or whether it is indicated). Alternatively, whether the information on the PRACH resource is included in a payload of a specific DCI format (e.g., DCI format whose CRC is scrambled by an RA-RNTI, DCI format 1_0, etc.). Alternatively, the above-described method may be used regardless of whether the terminal performs repeated PRACH transmission. Regardless of whether the terminal performs repeated PRACH transmission, the base station may inform the terminal of information on the PRACH resource through which it has successfully received the PRACH by the above-described method.

As described above, the terminal may expect to receive the RAR in the RAR window. For example, the terminal may monitor a PDCCH whose CRC is scrambled by a specific RNTI (e.g., RA-RNTI) in the RAR window, and if a PDCCH is successfully received, the terminal may receive a PDSCH including the corresponding RAR. In this case, a start time of the RAR window may be determined by a position of the PRACH resource or a transmission time of the PRACH. For example, the RAR window may start from a certain symbol that appears after X symbols from a certain symbol (e.g., the last symbol) of the reference PRACH resource (or the reference PRACH occasion). In an exemplary embodiment, X may be 1. Alternatively, the RAR window may start from the first symbol of the first CORE-SET (or search space set, PDCCH monitoring occasion) that appears after X symbols from a certain symbol (e.g., the last symbol) of the reference PRACH resource (or the reference PRACH occasion). The CORESET (or search space set, PDCCH monitoring occasion) may be a CORESET (or search space set, PDCCH monitoring occasion) on which the terminal monitors a PDCCH whose CRC is scrambled by the specific RNTI (e.g., RA-RNTI).

The reference PRACH resource (or reference PRACH occasion) for determining the RAR window may be the PRACH resource through which the terminal transmits the PRACH. Meanwhile, when the terminal transmits the PRACH in a plurality of PRACH resources according to the above-described method, the reference PRACH resource may be determined as any one resource among the PRACH resources through which the terminal transmits the PRACH. Specifically, the reference PRACH resource may be determined as one of the PRACH resources (e.g., N PRACH resources or M PRACH resources) configured for the terminal to perform the repeated PRACH transmissions. Alternatively, the reference PRACH resource may be determined as one of the PRACH resource(s) in which the terminal has actually transmitted the PRACH among the configured PRACH resources. For example, the reference PRACH resource may be the latest resource (or the earliest resource) among the PRACH resource(s). Alternatively, the reference PRACH resource may be determined as one resource (e.g., the latest resource or the earliest resource) among all PRACH resources (or all valid PRACH resources) in the PRACH resource period in which the terminal has transmitted the PRACH.

In addition, the value of the specific RNTI (e.g., RA-RNTI) used for transmission of the PDCCH and/or PDSCH may be determined by a temporal position of the above-described reference PRACH resource (or reference PRACH occasion). For example, the RA-RNTI value may be determined by an index of the one symbol (e.g., the first symbol or the last symbol) of the reference PRACH resource determined by the above-described method.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, comprising:
receiving first physical random access channel (PRACH) configuration information from a base station;
identifying first PRACH resources based on the first PRACH configuration information;
selecting M1 PRACH resources from among the first PRACH resources, wherein M1 is a natural number greater than 1; and
repeatedly transmitting a preamble to the base station by M1 times through the selected M1 PRACH resources in a first power ramping step,
wherein the M1 PRACH resources are selected by the terminal according to a predefined rule, the preamble is repeatedly transmitted by M1 times with a first transmission power in the first power ramping step, and the M1 PRACH resources are managed by a single power ramping counter.

2. The method according to claim 1, wherein the M1 PRACH resources are mapped to different time resources each having a same duration, and frequency resources to which the M1 PRACH resources are mapped are same.

3. The method according to claim 1, wherein the M1 PRACH resources are associated with one or more same synchronization signal blocks (SSBs), and the preamble is repeated transmitted by M1 times based on a same transmit spatial filter.

4. The method according to claim 1, wherein the M1 PRACH resources are associated with one or more same synchronization signal blocks (SSBs), and the preamble is repeated transmitted by M1 times based on different transmit spatial filters.

5. The method according to claim 1, wherein the M1 PRACH resources are mapped to a plurality of periods, and a first PRACH resource and a second PRACH resource, which are included in the M1 PRACH resources, are mapped to different periods.

6. The method according to claim 1, wherein the M1 PRACH resources are valid PRACH resources that do not overlap with a downlink symbol or a symbol to which an SSB is mapped.

7. The method according to claim 1, further comprising:
receiving second PRACH configuration information; and
identifying second PRACH resources based on the second PRACH configuration information,
wherein the M1 PRACH resources are selected from among the first PRACH resources and the second PRACH resources.

8. The method according to claim 1, wherein the first PRACH configuration information is received through system information from the base station, and is received before the terminal performs a random access procedure.

9. The method according to claim 1, further comprising: receiving a random access response (RAR) message in response to the preamble,
wherein a start time of an RAR window for receiving the RAR message is determined based on a latest PRACH resource among the M1 PRACH resources.

10. The method according to claim 9, wherein the RAR message is received through a physical downlink shared channel (PDSCH), which is scheduled by a physical downlink control channel (PDCCH) whose cyclic redundancy check (CRC) bits are scrambled with a random access (RA)—radio network temporary identifier (RNTI), and the RA-RNTI is determined based on an index of a first symbol of the latest PRACH resource.

11. The method according to claim 1, further comprising:
selecting M2 PRACH resources from among the first PRACH resources, wherein M2 is a natural number; and
transmitting the preamble to the base station by M2 times through the selected M2 PRACH resources in a second power ramping step,
wherein the M2 PRACH resources are selected by the terminal according to the predefined rule, the preamble is repeatedly transmitted by M2 times with a second transmission power in the second power ramping step.

12. A method of a base station, comprising:
transmitting first physical random access channel (PRACH) configuration information to a terminal; and
receiving a preamble from the terminal through M1 PRACH resources in a first power ramping step,
wherein the preamble is repeatedly transmitted from the terminal by M1 times through the M1 PRACH resources with a first transmission power in the first power ramping step, the M1 PRACH resources are selected by the terminal from among first PRACH resources configured based on the first PRACH configuration according to a predefined rule, and the M1 PRACH resources are managed by a single power ramping counter, M1 being a natural number greater than 1.

13. The method according to claim 12, wherein the M1 PRACH resources are mapped to different time resources each having a same duration, and frequency resources to which the M1 PRACH resources are mapped are same.

14. The method according to claim 12, wherein the M1 PRACH resources are associated with one or more same synchronization signal blocks (SSBs), and the preamble is repeated transmitted by M1 times based on a same transmit spatial filter.

15. The method according to claim 12, wherein the M1 PRACH resources are associated with one or more same synchronization signal blocks (SSBs), and the preamble is repeated transmitted by M1 times based on different transmit spatial filters.

16. The method according to claim 12, wherein the M1 PRACH resources are mapped to a plurality of periods, and a first PRACH resource and a second PRACH resource, which are included in the M1 PRACH resources, are mapped to different periods.

17. The method according to claim 12, wherein the M1 PRACH resources are valid PRACH resources that do not overlap with a downlink symbol or a symbol to which an SSB is mapped.

18. The method according to claim 12, further comprising: transmitting second PRACH configuration information, wherein the M1 PRACH resources are selected from among the first PRACH resources and second PRACH resources identified based on the second PRACH configuration information.

19. The method according to claim 12, further comprising: transmitting a random access response (RAR) message in response to the preamble,
wherein a start time of an RAR window for the terminal to receive the RAR message is determined based on a latest PRACH resource among the M1 PRACH resources, the RAR message is transmitted through a physical downlink shared channel (PDSCH), which is scheduled by a physical downlink control channel (PDCCH) whose cyclic redundancy check (CRC) bits are scrambled with a random access (RA)—radio network temporary identifier (RNTI), and the RA-RNTI is determined based on an index of a first symbol of the latest PRACH resource.

20. The method according to claim 12, further comprising: receiving the preamble from the terminal through M2 PRACH resources in a second power ramping step,
wherein the M2 PRACH resources are selected by the terminal from among the first PRACH resources, and the preamble is transmitted by the terminal by M2 times through the selected M2 PRACH resources with a second transmission power in the second power ramping step, M2 being a natural number.

* * * * *